United States Patent
Friesen et al.

(10) Patent No.: US 12,431,510 B2
(45) Date of Patent: *Sep. 30, 2025

(54) METAL-AIR CELL WITH PERFORMANCE ENHANCING ADDITIVE

(71) Applicant: ARIZONA BOARD OF REGENTS ACTING FOR AND ON BEHALF OF ARIZONA STATE UNIVERSITY, Tempe, AZ (US)

(72) Inventors: Cody A. Friesen, Fort McDowell, AZ (US); Daniel Buttry, Tempe, AZ (US)

(73) Assignee: ARIZONA BOARD OF REGENTS FOR AND ON BEHALF OF ARIZONA STATE UNIVERSITY, Tempe, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/542,198

(22) Filed: Dec. 3, 2021

(65) Prior Publication Data
US 2022/0149460 A1    May 12, 2022

Related U.S. Application Data

(60) Continuation of application No. 16/455,185, filed on Jun. 27, 2019, now Pat. No. 11,196,057, which is a
(Continued)

(51) Int. Cl.
*H01M 8/02* (2016.01)
*H01M 12/06* (2006.01)
(Continued)

(52) U.S. Cl.
CPC ............. *H01M 8/02* (2013.01); *H01M 12/06* (2013.01); *H01M 12/08* (2013.01); *H01M 4/86* (2013.01);
(Continued)

(58) Field of Classification Search
CPC ................ H01M 12/06; H01M 12/08; H01M 2300/0022; H01M 2300/0045; H01M 6/04; H01M 8/08
See application file for complete search history.

(56) References Cited

U.S. PATENT DOCUMENTS 3,758,344 A   9/1973   Oliapuram
4,343,869 A   8/1982   Oltman et al.
(Continued)

FOREIGN PATENT DOCUMENTS

EP   2023434    2/2009
JP   63-090114  4/1988
(Continued)

OTHER PUBLICATIONS

Japanese Office Action dated Aug. 25, 2015 for Appln. No. 2013-510287.
(Continued)

*Primary Examiner* — Jeremiah R Smith
(74) *Attorney, Agent, or Firm* — Pillsbury Winthrop Shaw Pittman, LLP

(57) ABSTRACT

Systems and methods drawn to an electrochemical cell comprising a low temperature ionic liquid comprising positive ions and negative ions and a performance enhancing additive added to the low temperature ionic liquid. The additive dissolves in the ionic liquid to form cations, which are coordinated with one or more negative ions forming ion complexes. The electrochemical cell also includes an air electrode configured to absorb and reduce oxygen. The ion complexes improve oxygen reduction thermodynamics and/or kinetics relative to the ionic liquid without the additive.

18 Claims, 29 Drawing Sheets

Related U.S. Application Data division of application No. 14/862,376, filed on Sep. 23, 2015, now Pat. No. 10,374,236, which is a division of application No. 13/105,794, filed on May 11, 2011, now Pat. No. 9,184,478, which is a continuation-in-part of application No. PCT/US2010/034235, filed on May 10, 2010.

(60) Provisional application No. 61/334,047, filed on May 12, 2010.

(51) Int. Cl.
*H01M 12/08* (2006.01)
*H01M 4/86* (2006.01)
*H01M 4/90* (2006.01)
*H01M 8/08* (2016.01)

(52) U.S. Cl.
CPC ............... *H01M 4/90* (2013.01); *H01M 8/08* (2013.01); *H01M 2300/0005* (2013.01); *H01M 2300/0022* (2013.01); *H01M 2300/0025* (2013.01); *H01M 2300/0045* (2013.01); *Y02E 60/10* (2013.01)

(56) References Cited

U.S. PATENT DOCUMENTS

| | | | |
|---|---|---|---|
| 4,397,730 | A | 8/1983 | Bindra |
| 5,731,101 | A | 3/1998 | Sherif et al. |
| 5,827,602 | A | 10/1998 | Koch et al. |
| 5,855,809 | A | 1/1999 | Angell et al. |
| 6,326,104 | B1 | 12/2001 | Caja et al. |
| 7,479,353 | B2 | 1/2009 | Hollenkamp et al. |
| 7,829,212 | B2 | 11/2010 | Visco et al. |
| 2006/0204835 | A1 | 9/2006 | Kelsey et al. |
| 2007/0026295 | A1 | 2/2007 | Angell et al. |
| 2007/0031714 | A1 | 2/2007 | Huang |
| 2007/0212615 | A1 | 9/2007 | Jost et al. |
| 2007/0243449 | A1 | 10/2007 | Tadashi et al. |
| 2007/0278109 | A1 | 12/2007 | Kendig et al. |
| 2008/0008930 | A1 | 1/2008 | Matsumoto et al. |
| 2008/0038641 | A1 | 2/2008 | Visco et al. |
| 2008/0096074 | A1 | 4/2008 | Wu |
| 2009/0239146 | A1 | 9/2009 | Nakagawa et al. |

FOREIGN PATENT DOCUMENTS

| | | |
|---|---|---|
| JP | 63-170304 | 7/1988 |
| JP | 03-133988 | 6/1991 |
| JP | 11-125409 | 5/1999 |
| JP | 2006-324144 | 11/2006 |
| JP | 2006-344446 | 12/2006 |
| JP | 2007-224001 | 9/2007 |
| JP | 2008-066202 | 3/2008 |
| JP | 2008-293678 | 12/2008 |
| JP | 2010-238648 | 10/2010 |
| WO | WO 2010132357 | 11/2010 |

OTHER PUBLICATIONS

Chinese Office Action dated Jul. 22, 2015 for Appln. No. 201180031002.1.
Chinese Office Action dated Dec. 2, 2014 for Appln. No. 201180031002.1.
Japanese Office Action dated Nov. 4, 2014 for Appln. No. 2013-510287.
"Hydrogen Redox in Protic Ionic Liquids and a Direct Measurement of Proton Thermodynamics", 1 A. Bautista-Martinez, et al. J. Phys. Chem. C, 2009, vol. 113, No. 28, 12586-12593.
International Preliminary Report on Patentabiliyt of PCT/US2011/036151, filed May 11, 2011.
Lewandowski, et al.; "Ionic liquids as electrolytes for Li-ion batteries—An overview of electrochemical studies" Journal of Power of Sources, vol. 194, No. 2, pp. 601-609 (2009).
"Investigations of oxygen reduction reactions in non-aqueous electrolytes and the lithium-air battery" by Cormac Micheal Olaoire, Chemistry Dissertation Paper 17, Northeastern University—Department of Chemistry and Chemical Biology (Jan. 1, 2010).
"Kinetics and Thermodynamics of Hydrogen Oxifdation and Oxygen Reduction in Hydrophobic Room-Temperature Ionic Liquids" by Rollins et al., J. electrochem. Soc. (2009) 156(8):B943-B954.
"Electroreduction of Oxygen in a Series of Room Temperature Ionic Liquids Composed of Group 15-Centered Cations and Anions" by Evans et al., J. Phys. Chem. B (2004) 108:7878-7886.
"On the Critical Temperature, Normal Boiling POint, and Vapor Pressure of Ionoc Liquids" by Rebelo et al., Journal of Phys Chem B Letters (2005) 109:6040-6043.
"The Reduction of Oxygen in Various Room Temperature Ionic Liquids in the Temperature Range 293-318 K: Exploring the Applicability of the Stokes-Einstein Relationship in Room Temperature Ionic Liquids" by Huang et al., J. Phys Chem B (2009), 113:8953-8959.
"A binary ionic liquid system composed of N-methoxyethyi-N-methylpyrrolidinium bis(trifluoromethanesulfonyl) imide and lithium bis(trifluoromethanesulfonyl)imide: A new promising electrolyte for lithium batteries" by Ferrari et al., J. Power Sources (2009), 194:45-50.
Water-Induced Diproportionation of Superoxide Ion in Aprotic Solvents by Che et al., J. Phys. Chem. (1996) 100:20134-20137.
"Electroreduction of Oxygen in a Series of Room Temperature Ionic Liquids Composed of 15-Centered Cations and Anions", (Evans, Klymenko, Saddoughi, Hardacre, and Compton, vol. 108, pp. 7878-7886, J. Phys. Chem B (2004), hereinafter Evans, published on the Web May 18, 2004).
"Superoxide Protonation by Weak Acids in Imidazoleum Based lonic Liquids", (Rene, Hauchard, Lagrost, and Hapiot, vol. 113 , J. Phys Chem. B (2009) pp. 2826-2831), hereinafter Rene, published on the Web Feb. 10, 2009).
"Elucidating the Mechanism of Oxygen Reduction for Lithium-Air Battery Applications", (Laoire, Mukerjee and Abraham, 113, J. Phys. Chem. C, 20127-20134 (2009), hereinafter Laoire).
"Roles of Ion Pairing on Electroreduction of Dioxygen in Imidazoleum-Cation Based Room Temperature Ionic Liquid", (Islam and Ohsaka, vol. 112, pp. 1269-1275 J. Phys. Chem. C (2008) hereinafter Islam, published on the Web Jan. 4, 2008).
Non-final Office Action Japanese Patent Application No. 2016-177869 dated Aug. 8, 2017 with English translation.
Non-final Office Action Japanese Patent Application No. 2016-177869 dated Dec. 5, 2017 with English translation.
European Office Action dated Jan. 11, 2016 for Appln. No. 11727348.2.
Japanese Office Action dated May 10, 2016 for Appln. No. 2013-510287.
"Toward Understanding the Origin of Positive Effects of Ionic Liquids on Catalysis: Formation of More Reactive Catalysts and Stabilization of Reactive Intermediates and Transition States in Ionic Liquids" (J. Lee, J. Shin, Y. Chun, H. Jang, C. Song, and S. Lee, Accounts of Chemical Research, vol. 43, No. 7, pp. 985-994 (2010), published on the Web.
"A binary ionic liquid system composed of N-methoxyethyi-N-methyl pyrrolidinium Bis(trifluoromethanesulfonyl)-imide and Lithium bis(trifluoromethanesulfonyl) imide: A new promising electrolyte for lithium batteries", (Ferrari, Quartarone, Mustarelli, Magistris, Protti, Lazzaroni, Fagnoni and Albini, 194, J. Power Sources, 45-50, (2009).
"Solvent-Free Electrolytes with Aqueous Solution-like Conductivities", (Xu and Angell, 302 Science, 422-425 (2003).
"Superoxide Anion is the Intermediate in the Oxygen Reduction Reaction on Platinum Electrodes", Shao and Adzic, 128 J. Amer. Chem. Soc., 7408-7409 (2006).
"Kinetics and Thermodynamics of Hydrogen Oxidation and Oxygen Reduction in Hydrophobic Room-Temperature Ionic Liquids", Rollins and Conboy, 156(8) J. Electrochem. Soc. 2009, 8943-8954.

(56) References Cited

OTHER PUBLICATIONS

"On the Critical Temperature, Normal Boiling Point, and Vapor Pressure of Ionic Liquids" by Rebelo, Lopes, Esperanga and Filipe, The Journal of Physical Chemistry B Letters, vol. 109, 6040-6043 (2005), 6040, published on the Web Mar. 12, 2005.

"Lithium-air batteries using hydrophobic room temperature ionic liquid electrolyte", Kuboki, Okuyama, Ohsaki and Takami, 146 J. of Power Sources, 766-769, (2005).

"Ionic liquids as electrolytes for Li-ion batteries—An overview of electrochemical studies", Lewandowski and Swiderska-Mocek, Journal of Power Sources, 194 (2009) 601-609.

"Brønsted Acid-Base Ionic Liquids as Proton-Conducting Nonaqueoous Electrolytes", Noda, Susan, Kudo, Mitsushima, Hayamizu, and Watanabe, J. Phys. Chem. B, (2003) 107, 4024-4033.

| 102 mixing metal ions with an ionic liquid to create a solution comprising a metal ion-negative ion complex |
|---|
| 104 exposing the solution to oxygen |
| 106 electrochemically reducing the oxygen |
| 108 forming a metal-oxide by-products at a metal fuel electrode |
| 110 storing the metal-oxide by-products at the metal electrode |
| 112 forming a metal-oxide by-product at an air electrode |
| 114 storing the metal-oxide by-products at the air electrode |

Figure 4

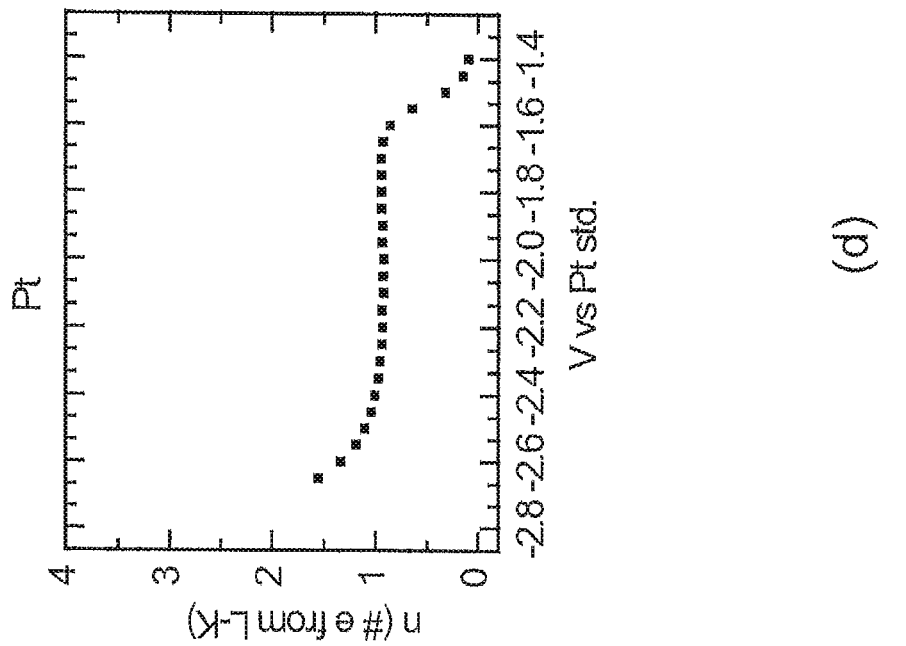
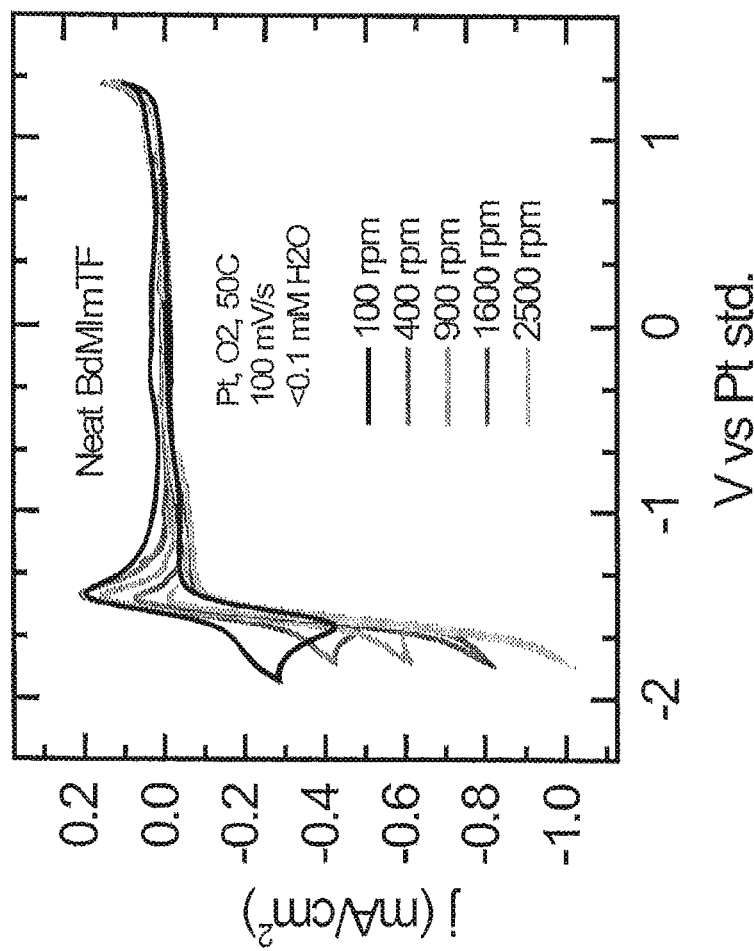
Figure 5

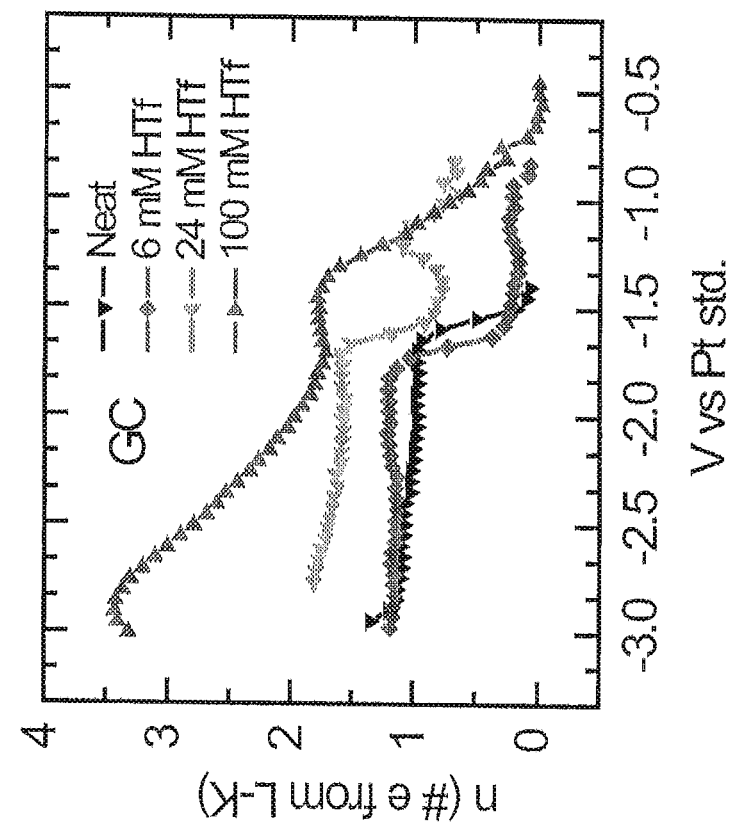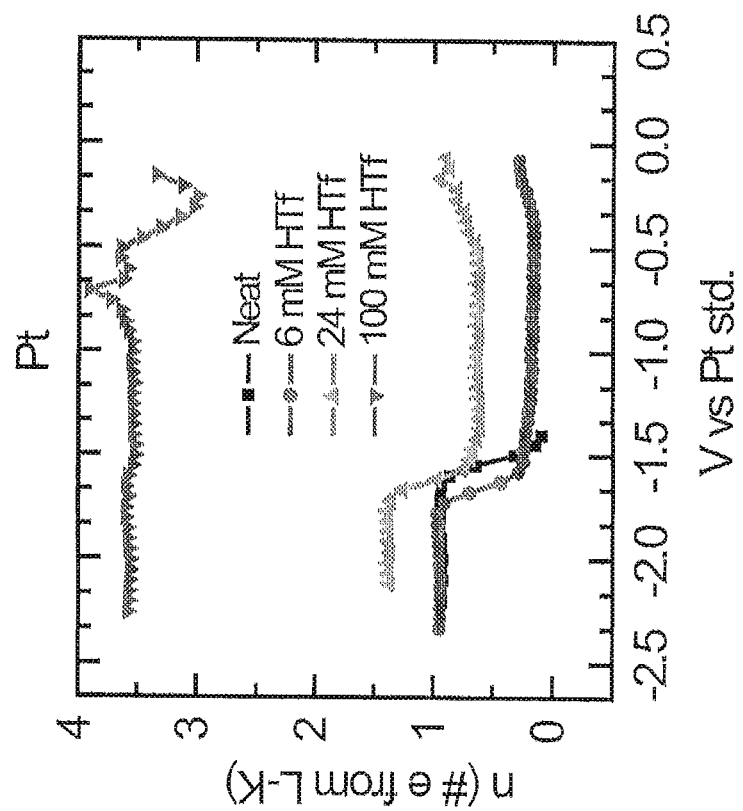
Figure 8

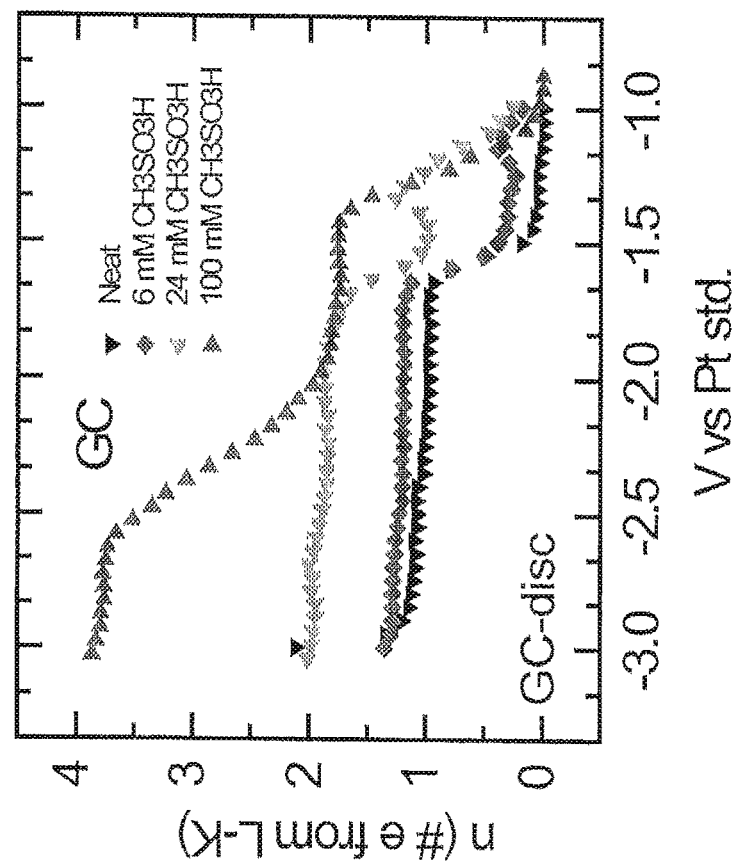
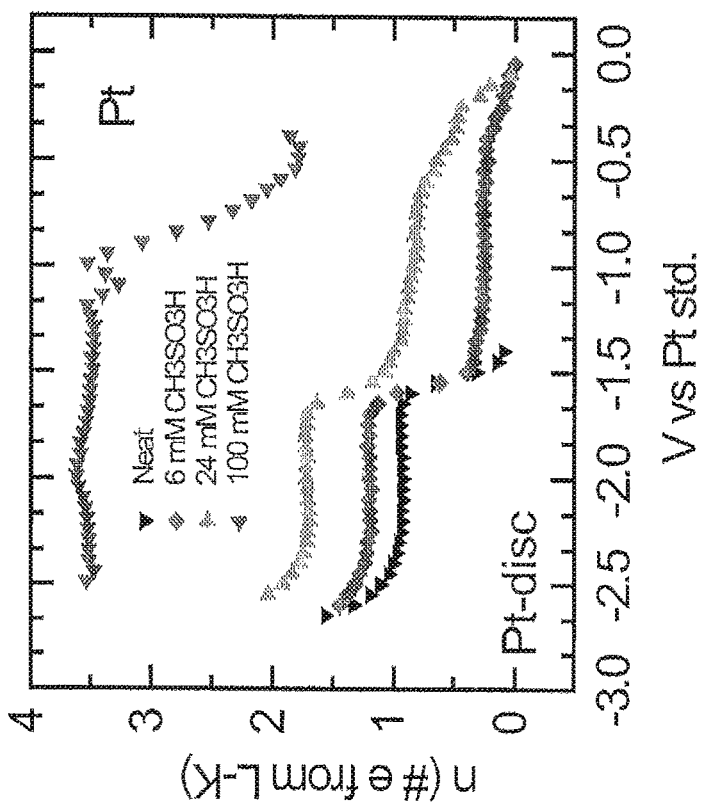
Figure 9

METAL-AIR CELL WITH PERFORMANCE ENHANCING ADDITIVE

RELATED APPLICATION

This application is a Continuation Application of U.S. Ser. No. 16/455,185, filed Jun. 27, 2019, which is a Divisional Application of U.S. application Ser. No. 14/862,376, filed Sep. 23, 2015, now U.S. Pat. No. 10,374,236, which is a Divisional Application of U.S. application Ser. No. 13/105,794, filed May 11, 2011, now U.S. Pat. No. 9,184,478, which in turn claims priority from U.S. Provisional Application No. 61/334,047, filed May 12, 2010, and PCT/US2010/034235, filed May 10, 2010, the entire contents of each of these applications are incorporated herein by reference in their entireties.

STATEMENT REGARDING FEDERALLY SPONSORED RESEARCH

This invention was made with government support under ARPA-e grant No. AR0000038, awarded by the Advanced Research Projects Agency of the Department of Energy. The United States government has certain rights in this invention.

All publications, patents, and patent applications cited in this Specification are hereby incorporated by reference in their entirety.

BACKGROUND

Metal-air batteries typically include a fuel electrode at which metal fuel is oxidized, an air electrode at which oxygen is reduced, and an electrolyte for providing ion conductivity. A significant limiting factor with conventional metal-air batteries is the evaporation of the electrolyte solution, particularly the evaporation of the solvent, such as water in an aqueous electrolyte solution. Because the air electrode is required to be air permeable to absorb oxygen, it also may permit the solvent vapor, such as water vapor, to escape from the cell. Over time, the cell becomes incapable of operating effectively because of the depletion of the electrolyte. Indeed, in many cell designs this evaporation issue renders the cell inoperable before the fuel is consumed. And this issue is exacerbated in secondary (i.e., rechargeable) cells, because the fuel may be re-charged repeatedly over the life of the cell, whereas the electrolyte solution cannot (absent replenishment from an external source). Also, in rechargeable cells, the water solvent is typically oxidized to evolve oxygen during re-charge, which also depletes the solution.

To compensate for this problem, metal-air batteries with aqueous electrolyte solutions are typically designed to contain a relatively high volume of electrolyte solution. Some cell designs even incorporate means for replenishing the electrolyte from an adjacent reservoir to maintain the electrolyte level. However, either approach adds to both the overall size of the cell, as well as the weight of the cell, without enhancing the cell performance (except to ensure that there is a significant volume of electrolyte solution to offset evaporation of the water or other solvent over time). Specifically, the cell performance is generally determined by the fuel characteristics, the electrode characteristics, the electrolyte characteristics, and the amount of electrode surface area available for reactions to take place. But the volume of electrolyte solution in the cell generally does not have a significant beneficial effect on cell performance, and thus generally only detracts from cell performance in terms of volumetric and weight based ratios (power to volume or weight, and energy to volume or weight). Also, an excessive volume of electrolyte solution may create a higher amount of spacing between the electrodes, which may increase ohmic resistance and detract from performance.

SUMMARY

Embodiments provided herein are related to electrochemical metal-air cells and more particularly to an electrochemical metal-air cell having an ionically conductive medium, which can include an additive that improves oxygen reduction thermodynamics, kinetics, or both.

An embodiment is related to an electrochemical cell comprising: a fuel electrode for oxidizing a metal fuel; a low temperature ionic liquid comprising positive ions and negative ions; an oxygen reduction enhancing compound added to the low temperature ionic liquid to form oxygen reduction enhancing positive ions, wherein the oxygen reduction enhancing positive ions are coordinated with one or more negative ions forming oxygen reduction enhancing positive-negative ion complexes; and an air electrode configured to absorb and reduce oxygen, wherein the oxygen reduction enhancing positive-negative ion complex improves oxygen reduction thermodynamics, kinetics, or both, relative to the ionic liquid without the oxygen reduction enhancing compound.

An alternative embodiment is related to a method comprising: mixing an oxygen reduction enhancing compound with a low temperature ionic liquid to create a solution comprising an oxygen reduction enhancing positive-negative ion complex; exposing the solution to oxygen; and electrochemically reducing the oxygen.

Another embodiment is related to an electrochemical cell comprising: a metal fuel electrode for oxidizing a metal fuel; a low temperature ionic liquid comprising positive ions and negative ions; a local oxide formation promoting compound added to the low temperature ionic liquid, the local oxide formation promoting additive dissolving in the low temperature ionic liquid to form local oxide formation promoting positive ions, wherein the positive ions of the local oxide formation promoting compound are coordinated with one or more negative ions forming local oxide formation promoting positive ion-negative ion complexes; and an air electrode configured to absorb and reduce oxygen, and store oxides of the metal fuel; wherein the local oxide formation promoting positive ion-negative ion complex increases the formation and storage of oxides of the metal fuel at the air electrode during discharge relative to the ionic liquid without the local oxide formation promoting compound.

Another embodiment is related to an electrochemical cell comprising: a fuel electrode for oxidizing a metal fuel; an ionically conductive medium comprising at least one aprotic ionic liquid and at least one protic ionic liquid comprising at least one available proton per ion pair; and an air electrode configured to absorb and reduce oxygen.

An alternative embodiment is related to a method comprising: mixing a protic ionic liquid with an aprotic ionic liquid to create an ionically conductive medium comprising negative ions and positive ions, wherein at least one of the positive ions is a proton; exposing the ionically conductive medium to oxygen; and electrochemically reducing the oxygen.

Another embodiment is related to an electrochemical cell comprising: a metal fuel electrode for oxidizing a metal fuel; an ionically conductive medium comprising at least one aprotic ionic liquid and at least one protic ionic liquid comprising at least one proton; an air electrode configured to absorb and reduce oxygen and store oxides of the metal fuel, wherein the proton increases the formation and storage of oxides of the metal fuel at the air electrode during discharge relative to the ionically conductive medium without the protic ionic liquid.

BRIEF DESCRIPTION OF THE DRAWINGS

FIG. 4 is a flow diagram illustrating a method embodiment.

FIGS. 5(c)-5(d) respectively show a cyclic voltammograms (CV) and the result of the Koutecky-Levich ("L-K") analysis with respect to the number of electrons per 02 vs. potential.

FIGS. 8(d)-8(e) show the results of the K-K analysis.

DETAILED DESCRIPTION

Figure 1:
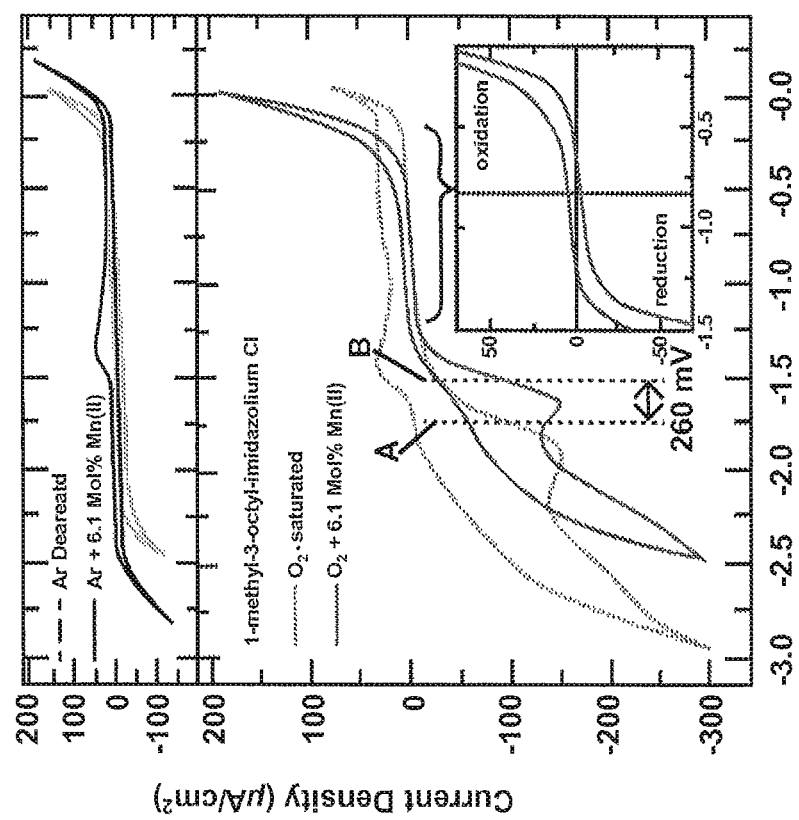
FIG. 1 is a cyclic voltammogram illustrating improvement in kinetics and thermodynamics of a metal ion-ionic liquid solution according to an embodiment.
Figure 2A:
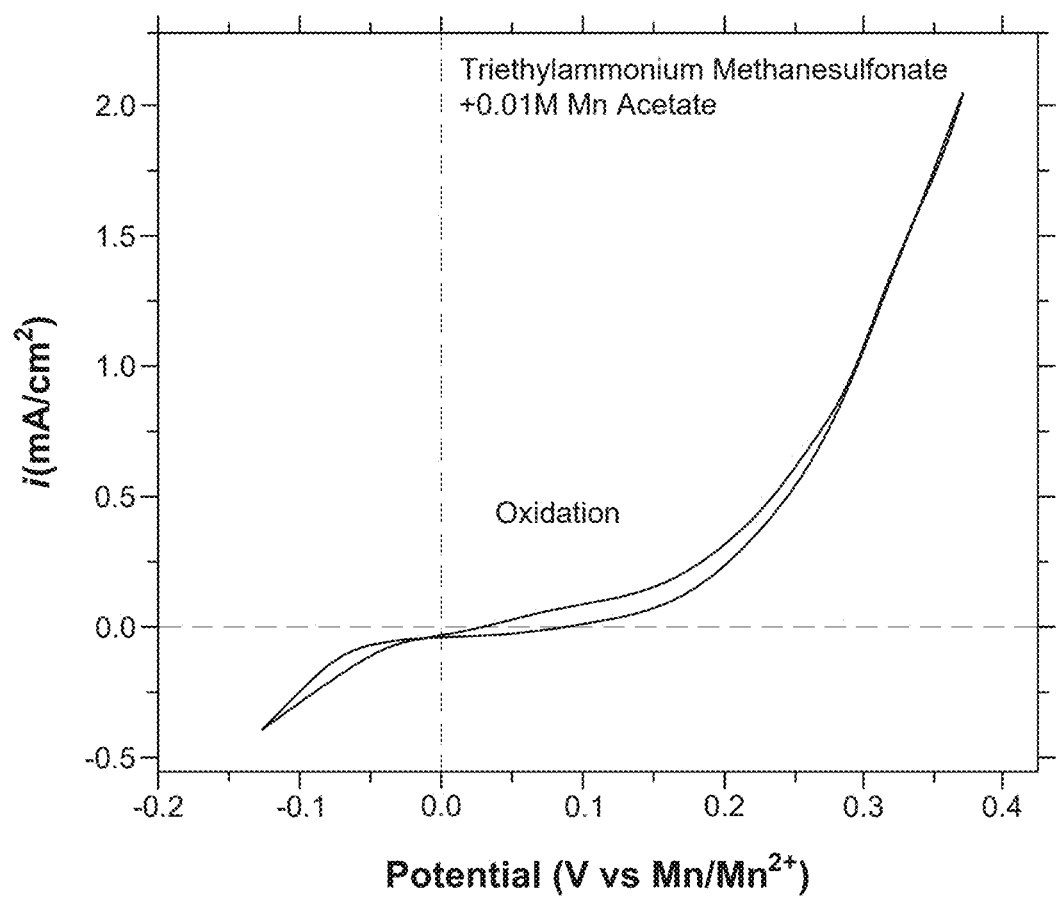
FIG. 2 illustrates cyclic voltammograms of various embodiments including (a) 0.01M Mn(II) acetate+triethylammonium methansulfonate, (b) 1M $ZnCl_2$+diethylmethylammonium triflate, (c) 5M $AlCl_3$+1-butyl-3-methylimidazolium bis(trifluoromethane)sulfonamide, and (d) $GaCl_3$+1-methyl-3-octylimidazolium tetrachlorogallate (1:1).
Figure 2B:
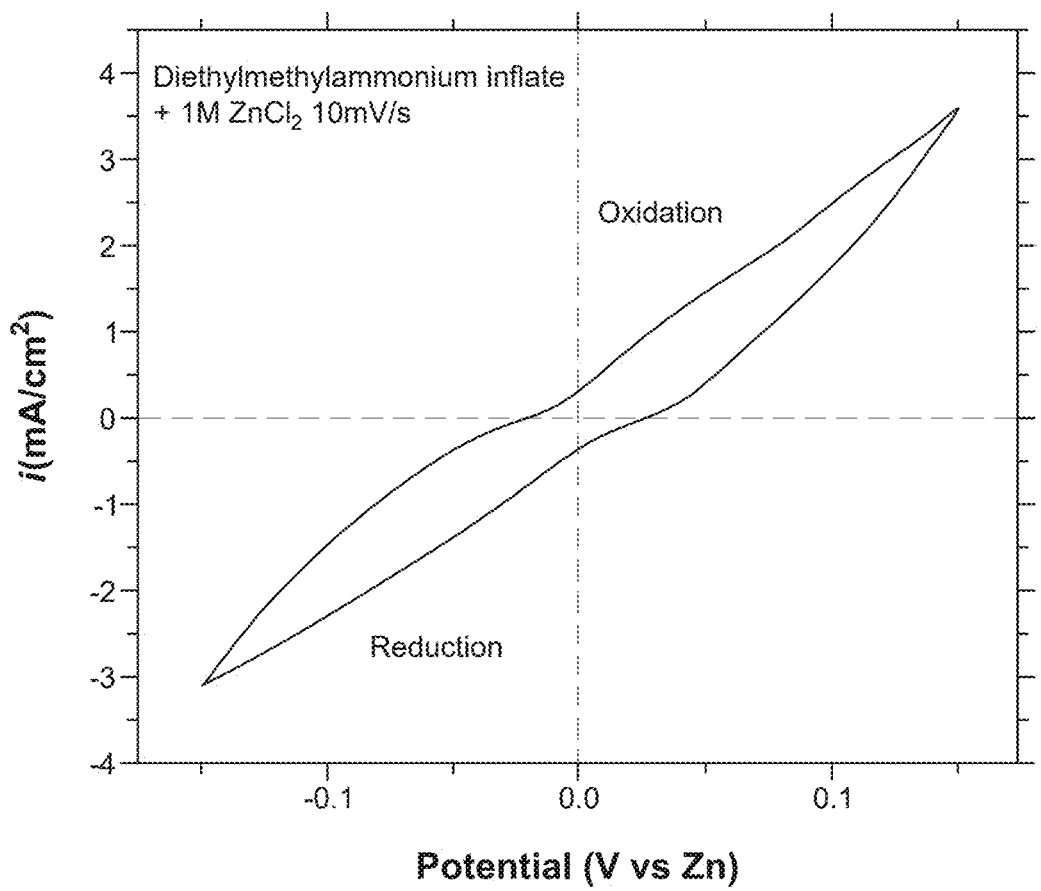
Figure 2C:
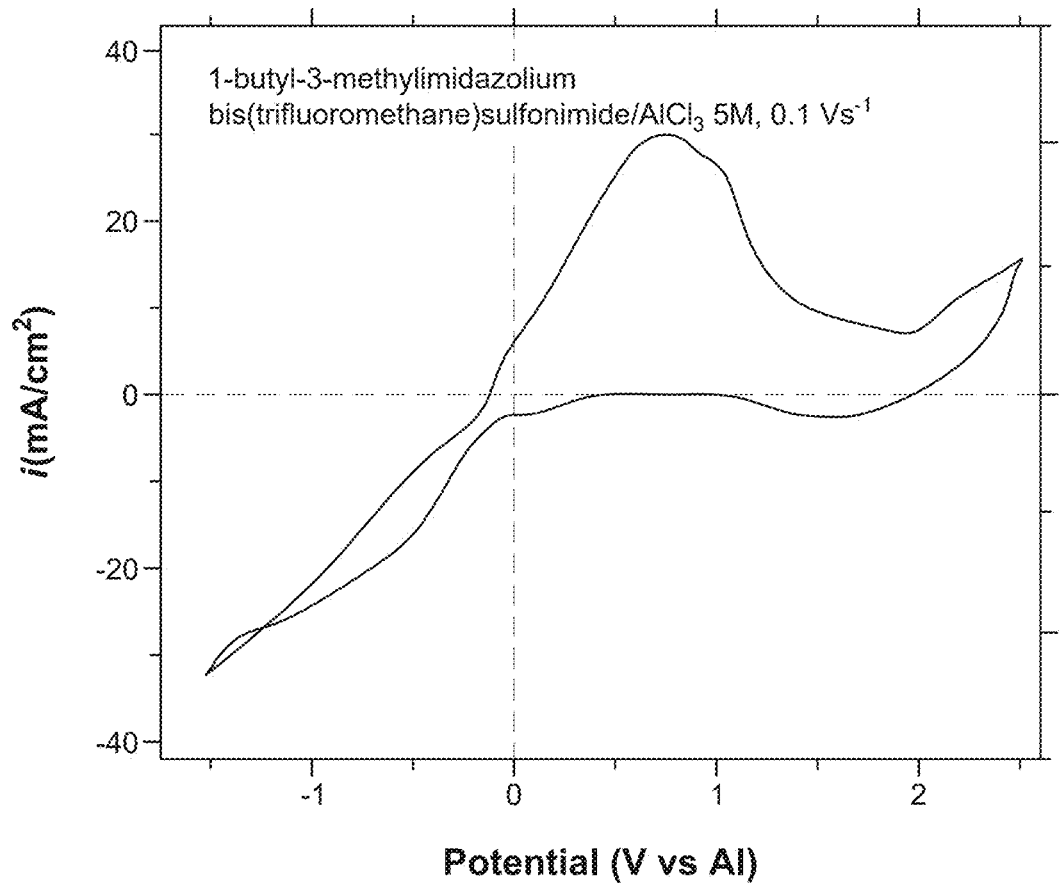
Figure 2D:
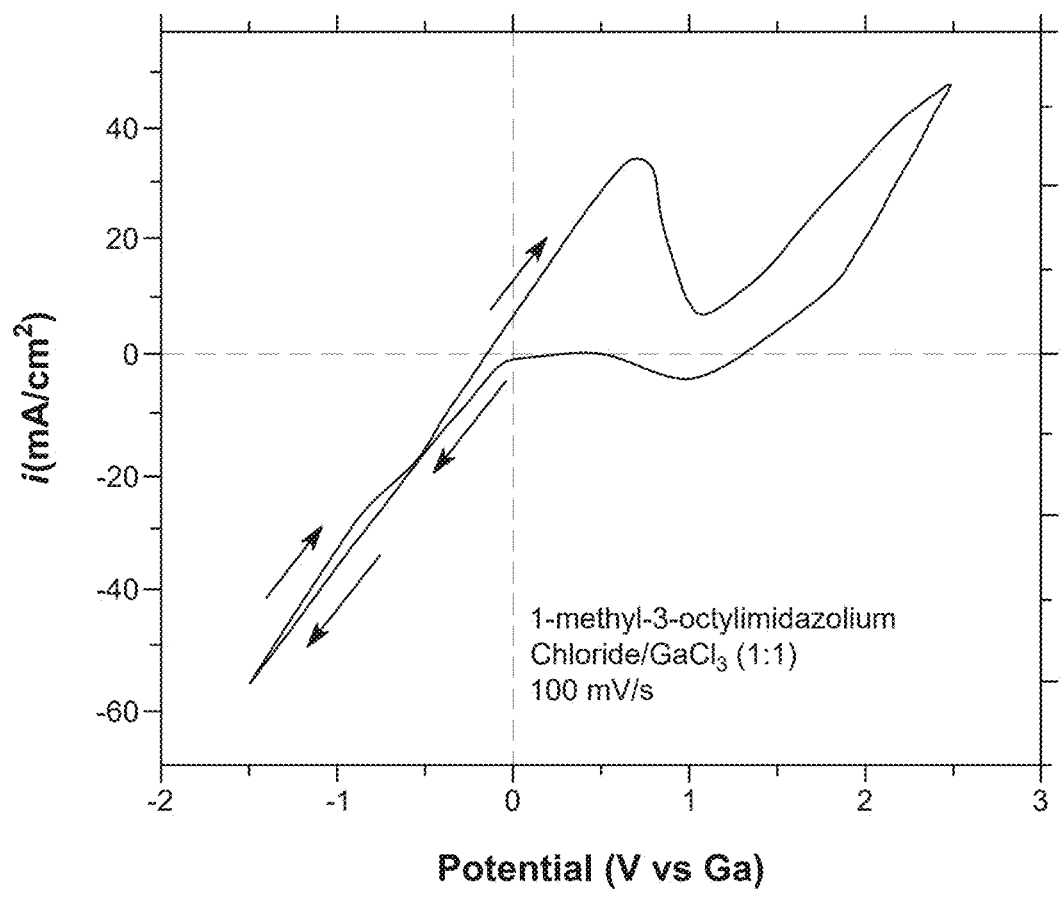

One embodiment described herein is an electrochemical cell comprising a fuel electrode, an air electrode, and an ionically conductive medium. The cell can be, for example, part of a metal-air battery, such as a rechargeable metal-air battery; the battery can also be non-rechargeable. A fuel electrode can oxidize a fuel, such as a metal fuel in the embodiment of a metal-air battery. The air electrode can be configured to absorb and reduce air, such as oxygen, to store the by-products, such as oxides.

Oxygen Reduction Enhancing Compound

The addition of an oxygen reduction enhancing compound to a low temperature ionic liquid containing medium of a metal-air battery may improve oxygen reduction thermodynamics and/or kinetics relative to the same medium without the added compound. It is believed that the oxygen reduction enhancing compound can dissociate into oxygen reduction enhancing positive ions ("cations"), which can coordinate with one or more negative ions ("anions") to form oxygen reduction enhancing positive-negative ion complexes.

The oxygen reduction enhancing compound can be a variety of compounds. For example, it can be in the form of an additive. The additive can comprise an inorganic or an organic molecule. The additive can also comprise water. Alternatively, the additive can comprise a metal (as in a metal-containing additive), an organic molecule, water, any of the additives described below, or combinations thereof.

The additive can be a metal-containing additive. The metal in the metal-containing additive can be any suitable metal. For example, the metal in the metal-containing additive in one embodiment can be at least one of Mg, Al, Mn, Ga, and Zn. In one embodiment, it is believed that the metal containing compound dissociates into positive metal ions, which associate and/or coordinate with negative ions in solution to form a metal centered-negative ion complex, which in turn enhances the oxygen reduction reaction thermodynamics and/or kinetics relative to the ionic liquid without the compound.

The organic molecule can be any suitable organic molecule. For example, it can be a protic organic molecule, thus the additive can be referred to as a protic organic molecule containing additive. The term protic is further described below. The organic molecule containing additive can comprise triflic acid (HTf), benzonitrile: FITf, acetophenone: HTf, methanesulfonic acid, hydronium triflate, pyridazinium triflate, acetic acid, pyridinium triflate, 1,2-dimethylimidaozlium triflate, n,n-diethyl-n-methylammonium triflate, 2,2,2-trifluoroethanol, 2-butyl-1,1,3,3-tetramethylguanidinium triflate, or combinations thereof. Note that triflic acid (HTf) can sometimes be referred to as trifluoromethanesulfonic acid.

The term "complex" and the term "complexation" are generally known in the art. In one embodiment, a complex can be a compound, a molecule, or a plurality of ions being in close proximity to one another without being chemically bonded. In one alternative embodiment, some chemical bonding can also be present. The attractive force that allows the ions to be in such proximity can arise from sources such as van der waals force, hydrogen bonding, and the like. Note that the formation of a complex is not limited to the scenarios described herein.

The oxygen reduction reaction, and thus the improvement thereof, can be evaluated based on thermodynamics, kinetics, or both, of the reaction. In one embodiment, thermodynamics is a metric that can be used to evaluate a system at equilibrium, while kinetics is one that can be used to evaluate a system based on a temporal change—e.g., its reaction rate. One example of a thermodynamics parameter is voltage (or electrical potential)—e.g., turn-on potential, half-wave potential, etc. On the other hand, one example of a kinetics parameter is current (or current density). Accordingly, the improvement in thermodynamics may be measured as a shift in the turn-on potential for oxygen reduction or a shift in the half wave potential. The improvement in kinetics may be measured by the increase in current density at a given potential. Additionally, the presence of metal ion-negative ion complexes may enhance the reversibility of an air cathode of the metal-air ionic liquid battery. The improvement in reversibility may be particularly beneficial with aprotic ionic liquids, as discussed in more detail below.

The redox reactions in the electrochemical cell described herein can involve the transfer of different numbers of electrons. For example, in one embodiment, the oxygen reduction half-reaction can involve the transfer of at least two electrons per oxygen molecule, such as at least four electrons per oxygen molecule; it can also be a combination of these two, as discussed below. Each of these reactions can have its advantages. For example, an one-electron oxygen reduction reaction can be highly reversible, efficient, but has low power density, cell potential, and/or reactivity. By contrast, a four-electron reaction can have the highest power density but have low round-trip (RT) efficiency and may need a catalyst (e.g., peroxide). A two-electron reaction can have intermediate power/efficiency, but at the same time may face peroxide instability challenges. On the other hand, the cathode for an one-electron reaction is preferably ultra-thin, invariant, and/or water-proof, whereas that for a four-electron reaction is preferably thin, invariant, and/or with bifunctionality. The cathode for a two-electron reaction generally can be thick, variant, and/or porous. In one embodiment, a "bifunctional" electrode can be used for both oxygen reduction and oxygen gas evolution, whereas an invariant electrode can only be used for one of these two functions, but not both.

Ionic Liquids

The ionically conductive medium can comprise at least one ionic liquid ("IL"). Ionic liquids generally refer to salts that form stable liquids comprising ions. That is, ionic liquids are fully dissociated, consisting essentially of negative and positive ions. Thus, ionic liquids inherently conduct electricity. Further, ionic liquids have negligible vapor pressure, low viscosity, wide liquidus range (up to 400° C.), tunable hydrophobicity, high thermal stability, and a large electrochemical window (>5V). Because of these properties, ionic liquids typically will not evaporate or be consumed during the charge/discharge cycle of an electrochemical cell.

Presently described embodiments include ionic liquids that are low temperature IL. The ILs can have a vapor pressure at or below 1 mm Hg at 20° C. above its melting point, and preferably at or below 0.1 mmHg or zero or essentially immeasurable at 20° C. above its melting point. Room temperature ionic liquids ("RTIL") are salts which form a stable liquid at 100° C. or below at 1 atm pressure (i.e., they have a melting point at 100° C. or below at 1 atm). In one embodiment, a low temperature ionic liquid is defined as an ionic liquid having a melting point at or below 150° C. at 1 atm. Low temperature ionic liquids may also include the various RTILs. Some examples of low temperature ILs can include triethylammonium methanesulfonate, 1-methyl-3-octylimidazolium tetrachlorogallate, diethylmethylammonium triflate, and 1-butyl-3-methylimidazolium bis(trifluoromethane)sulfonamide, or combinations thereof.

The presently described low temperature ionic liquid can also be one that comprises an anion selected from the group consisting of tetrachloroaluminate, bis(trifluoromethylsulfonyl)imide, methylsulfonate, nitrate, and acetate, or derivatives and/or combinations thereof Alternatively, the presently described low temperature ionic liquid can also be one that comprises a cation selected from the group consisting of imidazolium, sulfonium, pyrrolidinium, pyridinium, triethylammonium, diethylmethylammonium, dimethylethylammonium, ethylammonium, a-picolinium, 1,8-bis(dimethylamino)naphthalene, 2,6-di-tert-butylpyridine, quaternized ammonium and phosphonium, or derivatives and/or combinations thereof.

Even though low temperature or room temperature ionic liquids are defined by their respective melting points at 1 atm, in some embodiments the cell may be operated in an environment with a different pressure, and thus the melting point may vary with the operating pressure. Thus, reference to a melting point at 1 atm is used only as a reference point to define these liquids, and does not imply or restrict its actual use conditions in operation.

ILs can come in two forms: protic and aprotic. Protic ILs have available protons which may be oxidized or reduced or may coordinate with negative ions, such as reduced oxygen. In one embodiment, a protic IL can be an ionic liquid formed by proton transfer from a Bronsted acid (HA) to a Bronsted base (B), such as $$HA + B \rightarrow A^- + BH^+,$$

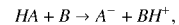

When the cation of the protic ionic liquid contains a reversible proton, it is referred to the fact that the reaction above is reversible. By contrast, a "strongly bound proton" herein refers to the fact that the proton transfer energetics can disfavor rendering the reaction above reversible.

In some incidence, an IL can be referred to as protic if it has reversibly electrochemically available proton(s). Namely, the deprotonated leaving group of the IL molecule does not result in a decomposition pathway. These available protons of a protic IL can increase the oxygen reduction reaction. Note that the term protic can also be used to describe an additive, or any other compound that has the aforedescribed protic property. In one embodiment wherein the ionic liquid comprises a protic ionic liquid, the protic ionic liquid can comprise at least one cation comprising at least one reversible proton.

Some examples of protic ILs are synthesized from combinations of anions tetrachloroaluminate, bis(trifluoromethylsulfonyl)imide, methylsulfonate, nitrate, and acetate, and cations triethylammonium, diethylmethylammonium, dimethylethylammonium, ethylammonium, a-picolinium, pyridinium, and 1,8-bis(dimethylamino)naphthalene, 2,6-di-tert-butylpyridine, and derivatives of the guanadines, or derivatives and/or combinations thereof.

Aprotic ILs generally do not have proton activity. Some examples of aprotic RTILs are synthesized from combinations of anions chloride (Cl$^-$), hexafluorophosphate (PF$_6^-$), iodide, tetrafluoroborate, bis(trifluoromethyl sulfonyl)imide (C$_2$F$_6$NO$_4$S$_2$) trifluoromethanesulfonate (CF$_3$O$_3$S$^-$), and cations imidazolium, sulfonium, pyrrolidinium, quaternized ammonium or phosphonium and their derivatives. Despite a lack of proton activity, an aprotic IL can comprise a proton. For example, an aprotic ionic liquid can comprise at least one cation that has at least one strongly bound proton thereto. Many other options of ILs exist, and these lists of examples are not intended to be limiting in any way.

In some embodiments, ionic liquid is highly hydrophobic. In one embodiment, the ionically conductive medium is also hydrophobic. In these embodiments, the water content of the electrolyte is essentially zero, or has water contents below 10 ppm. In another embodiment, as described above, water can be added as an additive to the ionically conductive medium in order to improve oxygen reduction thermodynamics, kinetics, or both. Note that the addition of water can render the electrolyte (or the ionically conductive medium) system an aqueous system. Thus, the IL in water can also be referred to as an electrolyte in a solution. For example, water contents of about 5 to about 100,000 ppm, such as about 10 to about 50,000 ppm, such as about 100 to about 10,000 ppm, such as about 500 to about 5,000 ppm, can be added. It has been found by the present inventors that some addition of water can improve oxygen reduction of aprotic systems.

Tuning the hydrophobicity such that the solubility is in the range of 10-50,000 ppm can enable establishment of a constant water activity within the IL. In still other embodiments, a protic IL may be added to an aprotic IL. The addition may be performed via titration or any other suitable method. In this manner, protons can be added to a predominately aprotic IL, thereby improving the oxygen reduction reaction. Indeed, because the addition of the protic IL may be precisely controlled, the proton activity may be tailored as desired.

Reference may be made to U.S. Patent Application Ser. Nos. 61/267,240, 61/177,072, 12/776,962, and Ser. No. 13/085,714, each of which is incorporated by reference in its entirety, for further details concerning the construction and operation of a metal-air low temperature ionic liquid cell.

Electrochemical Cell

The air electrode can comprise a polymer, such as polytetrafluoroethylene (PTFE). The air electrode can also comprise a catalyst. The type of catalyst can vary, depending on the chemistry of the electrochemical cell. For example, the catalyst can be at least one of manganese oxide, nickel, pyrolized cobalt, porphyrin-based catalysts, activated carbon, perovskites, spinels, silver, platinum, and/or mixtures thereof. The air electrode can be permeable to air/gas. In one embodiment, the air electrode can further comprise a barrier membrane on one of its outer surface. The barrier membrane can be impermeable to gas, liquid, or both. In some instances, the air electrode can repel the ionically conductive medium, including the ionic liquid contained therein. In one embodiment, for example, the air electrode can repel a low temperature ionic liquid.

The fuel electrode can be porous. In one embodiment, the fuel electrode can comprise a backing. The backing can be, for example, impermeable to liquid, air, or both. Metal-oxide by-products can be formed during the operation of an electrochemical cell. The by-products can be formed at the fuel electrode. Further, the by-products can be stored at the fuel electrode. Similarly, such metal-oxide by-products can be formed and/or stored at the air electrodes.

In a metal-air battery, the metal is the fuel. That is, during discharge the metal is oxidized at the anode, providing electrons which can be used for electrical work. The oxidation reaction may be represented by the following equation:

The metal fuel may be of any type, and may be electrodeposited, absorbed, physically deposited, or otherwise provided on or constituting the fuel electrode. The fuel may be of any metal, including alloys or hydrides thereof, for example. For example, the fuel may comprise transition metals, alkali metals, alkali earth metals, and other or "poor" metals. Transition metals include, but are not limited to zinc, iron, manganese, and vanadium. The most common alkali metal is lithium but other alkali metals may be used. The alkali earth metals include but are not limited to magnesium. The other metals include, but are not limited to aluminum and gallium. As used herein, the term metal fuel refers broadly to any fuel comprising a metal, including elemental metal, metal bonded in a molecule, metal alloys, metal hydrides, etc. The fuel electrode may be formed of the metal fuel as the electrode body itself in some embodiments, The fuel electrode may have any construction or configuration. For example, the fuel electrode may be a porous structure with a three-dimensional network of pores, a mesh screen, a plurality of mesh screens isolated from one another, or any other suitable electrode. The fuel electrode includes a current collector, which may be a separate element, or the body on which the fuel is received may be electroconductive and thus also be the current collector. In an embodiment, the fuel electrode is laminated, bonded, or attached to a backing that provides the external surface of the fuel electrode. This backing may be liquid impermeable or essentially impermeable to the ionic liquid to prevent the ionic liquid from permeating outwardly through the fuel electrode via its external surface, The backing is also impermeable to air, and particularly oxygen or other oxidant, to prevent any undesirable parasitic reaction, such as oxidant reduction in the presence of the fuel oxidation that occurs at the electrode during discharge. Further details regarding metal fuels and fuel electrodes may be found in U.S. Pat. Nos. 8,168,337, 8,309,259, 8,895,197, and U.S. Patent Application Nos. 61/193,540, 61/329,278, and 61/243,970, the entirety of each of which are incorporated herein.

The air electrode is the counter electrode. During discharge, oxygen at the air electrode is reduced, consuming electrons. There are several possible mechanisms for oxygen reduction. The oxygen reduction reaction may occur, for example, via one of the three mechanisms discussed below. Other mechanism, however, may occur depending on the chemical system (ionic liquid, electrode materials) chosen.

Oxygen Reduction Reactions

The oxygen reduction reactions can be highly dependent on the pH in an aqueous system. However, it is noted that at a high pH, the nature of catalyst, if present, becomes less important as that in a low pH.

It is believed an oxygen reduction reaction ("ORR") in an aqueous system can take different forms, depending on the acidity of the system. For example, in an aqueous acid system, the reactions can be characterized as:

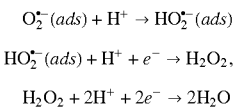

with the net reaction being:

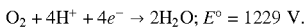

Several mechanisms in an acid system have been proposed. See Durand et. al., *Electrochimica Acta* (2003), Sawyer et al. 1981; Sawyer et al. 1981; *Analytical Chemistry*, vol. 54, pp. 1720 (1982); Honda, 1986. In some embodiments, a catalyst is provided to get useful rates. The catalyst can be, for example, silver and/or platinum. In one embodiment, superoxide pKa is about 4.7 in an aqueous system, but the conjugate base can drive the reaction so completely that it behaves as if it has a pKa of 24. Thus, the reaction can proceed even in the presence of a very weak acid, such as water.

On the other hand, in an aqueous basic (alkaline) system, the reactions can be characterized as:

$$O_2^-(ads) + H^+ \rightarrow HO_2^-(ads) + OH^-$$

$$HO_2^-(ads) + e^- \rightarrow HO_2^-,$$

$$HO_2^- + H_2O + 2e^- \rightarrow 3OH^-$$

with the net reaction being:

$$O_2 + 2H_2O + 4e^- \rightarrow 4OH^-, E° = 0.401 \text{ V}.$$

Several mechanisms in an alkaline system have been proposed. See Ross, P. N., *Handbook of Fuel Cells—Fundamentals, Technology and Applications*, eh 31 (2003), Durand et. al., *Electrochimica Acta* (2003).

It is believed that the ORR in a dry erotic system can have the mechanism below:

$$O_2 \rightarrow O_2(ads)$$

$$O_2(ads) + e^- \rightarrow O_2^-(ads)$$

$$O_2^-(ads) + BH^+ \rightarrow HO_2(ads) + B$$

$$HO_2^-(ads) + e^- \rightarrow HO_2^-$$

$$HO_2^-(ads) + BH^+ \rightarrow H_2O_2 + B$$

Further protonation of peroxidate by IL, as shown in the fifth reaction equation above, can produce peroxide, depending on pKa of BH+ (peroxide pKa=11.63). In principle, the reaction then proceeds as it may in an aqueous system:

$$H_2O_2 + e- \rightarrow OH^- + OH^+(ads)$$

$$OH^·(ads) + e- \rightarrow OH^-$$

$$2OH^- + 2BH^+ \rightarrow 2H_2O + 2B$$

Note that the protonation can depend on pKa of BH+.

A first possible and non-limiting mechanism is a four-electron ORR where the product is a fully reduced oxygen dianion. The four-electron oxygen reduction reaction may be represented by the following equation:

$$O_2 + 4e^- \rightarrow 2O^{2-} \quad (2)$$

Depending on the specific chemistry of the system, this reaction may form a soluble product or result locally in the formation of an insoluble metal-oxide, An example of a four-electron oxygen reduction reaction Equation (3), $$4AlCl + 3O_2 + 12e^- \rightarrow 2Al_2O_3 \square + 16Cl^- \quad (3)$$

In this reaction, the anions liberated may serve to mediate continued anode reaction. Relative to the other oxygen reduction mechanisms, the four-electron oxygen reduction reaction has the advantages of increased energy density and extracting the maximum number of electrons per oxygen molecule. This mechanism, however, tends to have larger overpotentials for oxide dissociation during the oxygen evolution reaction (OER) during recharge, decreasing round-trip efficiency.

The second possible and non-limiting mechanism is a two-electron peroxide route. An example of this mechanism may be represented by the following equation:

$$Zn^2 + O_2 + 2e^- \rightarrow (ZnO)_2 \quad (4)$$

This mechanism has the advantage of relatively low overpotentials for the peroxide reaction. It also tends to have enhanced rechargeability relative to the first mechanism. The two-electron peroxide mechanism, however, has a lower energy density at the oxygen electrode relative to a four-electron process.

The third possible and non-limiting mechanism is a mixed two-electron/four-electron ORR that capitalizes on the reducing power of certain aliovalent cations. An example of this mechanism may be represented by the following equation:

$$Mn^{2+} + O^2 + 2e^- \rightarrow MnO_2 \quad (5)$$

The nuance in this mechanism is that the product involves fully reduced $O^{2-}$ species generated by the reducing power of the aliovlant metal. In this example, $Mn^{2+}$ ends up in the $Mn^{4+}$ state on the right. This mechanism has the advantage of lower overpotentials, measured to be as large as 350 mV or lower, due to the reducing power of aliovalent cations. Further, aliovalent metals may be used to make more efficient cells. The mixed two-electron/four-electron mechanism, however, has a lower energy density at the oxygen electrode relative to a four-electron process.

FIG. 1 is a cyclic voltammogram of an air electrode half cell illustrating improvement in both the kinetics and thermodynamics of a metal ion-ionic liquid electrolyte in oxygen reduction according to an embodiment. In this embodiment, the electrolyte comprises oxygen saturated 1-methyl-3-octyl-imidazolium chloride with an addition of 6.1 Mol % $Mn^{2+}$. The comparative electrolyte is oxygen saturated 1-methyl-3-octyl-imidazolium chloride without any added metal ions.

The top portion of FIG. 1 shows baseline cyclic voltammograms for Ar-saturated (dearated) 1-methyl-3-octyl-imidizolium Chloride IL both with and without Mn(II) ions. The bottom portion of FIG. 1 shows that the addition of 6.1 Mol % $Mn^{2+}$ results in a shift of approximately 260 mV in the turn-on potential (the potential at which reduction starts) for oxygen reduction (02-saturated 1-methyl-3-octyl-imidizolium Chloride). That is, the half-cell potential for the 02 reduction reaction shifts more positive relative to the reference electrode with the addition of 6.1 Mol % Mn2+ to the oxygen saturated 1-methyl-3-octyl-imidazolium chloride ionic electrolyte, increasing the overall cell potential. In a Mn(II)-based battery, this improvement corresponds to an approximate 14% increase in practical energy.

Note in FIG. 1 the magnitude of the shift in the voltammograms is illustrated with a shift in the half wave potentials A, B, the half-wave potentials being easier to illustrate than the turn-on potentials. The half-wave potential (E112) is a potential at which the polarographic wave current is equal to one half of the diffusion current (id). That is, the potential, at which the current of a diffusion-controlled polarographic wave reaches one half of the total wave height. For a reversible redox-system, the half-wave potential is independent of concentration.

FIG. 1 also illustrates enhancement of the kinetics of reduction in the activation regime. At the half-wave potential (approximately 1.5V) of the Mn containing ionic liquid electrolyte, the current density of the Mn containing electrolyte is 2.9 times that of the comparative electrolyte at that same potential (approximately 1.5V). Additionally, the insert to FIG. 1 shows that the metal-oxide oxidation reaction of the oxygen saturated 1-methyl-3-octyl-imidazolium chloride-6.1 Mol % $Mn^{2+}$ system is reversible.

In some embodiments, the metal of the added metal containing compound is the same metal as that of the metal (fuel) electrode. In alternative embodiments, the added metal is different from that of the metal (fuel) electrode. In one aspect, the solubility of the metal ions of the added metal compound may be larger than the solubility of the metal ions of the fuel electrode. In this aspect, the metal ions of the added metal compound could promote oxygen reduction while the fuel metal oxide precipitates preferentially. In still other embodiments, two or more different metal containing compounds forming different metal ions are added to the low temperature IL. In these embodiments, one of the metals may be, but need not be, the same metals as that of the metal (fuel) electrode metal.

When the cell starts to operate, the fuel electrode dissolves, adding metal ions to the medium/solution. The thermodynamic and/or kinetic advantages of the added metal containing compound are sustained during the whole cycle. The initial quantity of an added metal containing compound may be viewed as a "supporting salt" since the metal cations carry along with them a set of anions (such as Cl⁻) that promote the complexation of cations from the anode. Also, once the saturation of metal ions is reached and precipitation of the metal oxide (peroxide, hydroxide, etc.) begins, the supporting ions can maintain a constant activity of metal-centered ions in a solution.

FIG. 2 illustrates cyclic voltammagrams of additional embodiments. Specifically, FIG. 2 shows metal redox for (a) 0,01M Mn(II) acetate+triethylammonium methansulfonate, (b) 1MZnCl$_2$+diethylmethylammonium triflate, (c) 5MAlCl$_3$+1-butyl-3-methylimidazolium bis(trifluoromethane)sulfonamide, and (d) GaCl$_3$+1-methyl-3-octylimidazolium tetrachlorogallate (1:1). As can be seen in FIG. 2, all of these systems show a high-degree of reversibility.

In another non-limiting embodiment, the ionic liquid may be triethylammonium methanesulfonate (TEAMS) with 0.5 molar zinc triflate dissolved therein as an additive, and zinc may be used as the metal fuel. Potentiostatic studies of the half-cell reactions for zinc and oxygen in that ionic liquid indicate a cell potential of about 1.45V, and an estimated cell energy density in excess of 600 Wh/kg. Potentiostatic studies on the same TEAMS ionic liquid with 0.5 molar zinc triflate supplemented with 50ppm water indicate a cell potential of about 1.5V. In another non-limiting embodiment, the ionic liquid may be TEAMS with 1.0 molar zinc bromide (ZnBr$_2$) dissolved as an additive, and zinc may be used as the metal fuel. Potentiostatic studies of the half-cell reactions for zinc and oxygen in that ionic liquid indicate a cell potential of about 1.3V, an estimated cell energy density in excess of 500 Wh/kg, and a relatively high degree of reversibility for the zinc and oxygen reactions, which is beneficial for secondary (rechargeable) cells.

In yet another non-limiting embodiment, the ionic liquid may be methyloctylimidazolium chloride with 0.5 molar manganese (II) chloride (MnC12) and 50 ppm water as additives, and manganese may be used as the metal fuel. Potentiostatic studies of the half-cell reactions for manganese and oxygen in that ionic liquid indicate a cell potential of about 1.5V and an estimated cell energy density of about 800 Wh/kg. In still another non-limiting embodiment, the ionic liquid may be 1-butyl-3-methylimidazolium bis(trifluoromethane)sulfonamide with 5.0 molar AlC13 as an additive, and aluminum may be used as the metal fuel. Potentiostatic studies of the half-cell reaction for aluminum in that ionic liquid indicate a cell potential of about 2.5-2.8 V, an estimated cell energy density of about 2500-3000 Wh/kg, and a relatively high degree of reversibility for the aluminum reaction.

In yet another non-limiting embodiment, the ionic liquid may be diethyl methyl ammonium triflate (DEMATf) with 0.5 M ZnC12 dissolved therein as an additive, and zinc may be used as the metal fuel. This embodiment has an estimated cell potential of about 1.3V. As still another non-limiting embodiment, the ionic liquid may be DEMATf with 0.5 M Zn(BF4)2 (zinc tetrafluoroborate). This embodiment has an estimated cell potential of about 1.45V.

Figure 3:
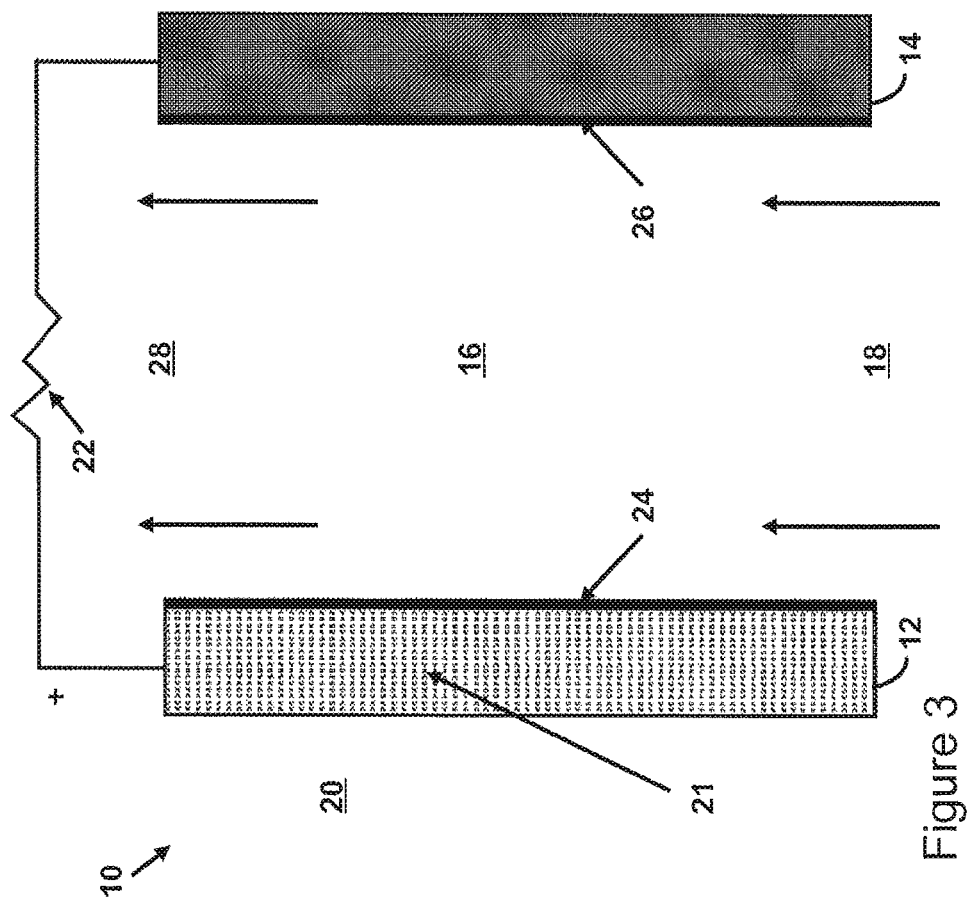
FIG. 3 is a schematic diagram of an electrochemical cell according to an embodiment.

FIG. 3 illustrates a low temperature IL electrochemical cell ("electrochemical cell"), generally indicated at 10, according to some embodiments described herein. As illustrated and described below, the electrochemical cell 10 includes a plurality of electrodes including a first electrode 12 and a second electrode 14. In other embodiments, the first electrode or the second electrode of the electrochemical cell 10 may be provided by configurations other than a single electrode. Thus, the use of a single electrode as presented in FIG. 1 for each of the first electrode 12 and the second electrode 14 is not intended to be limiting. In the non-limiting embodiment illustrated in FIG. 1, the first electrode 12 is a cathode, and more specifically an air cathode, and will be referred to hereinafter as an air electrode 12. The second electrode 14 is an anode, and will be referred to hereinafter as a metal electrode 14. In an embodiment, and as described below, the electrochemical cell 10 may generate electricity by virtue of an oxidation half-reaction of a fuel at the metal electrode 14 in parallel, that is, substantially at the same time, with a reduction half-reaction of an oxidizer 20 at the air electrode 12. The illustrated embodiment is not intended to be limiting in any way.

As shown in FIG. 3, and as discussed in further detail below, the air electrode 12 and the metal electrode 14 are spaced to form a gap 16 therebetween. An RTIL, generally indicated at 18, may flow along the gap 16 so that the low temperature IL 18 may contact both the air electrode 12 and the metal electrode 14 at the same time. In an embodiment, it should be understood that the electrochemical cell 10 may be oriented in any way, and the low temperature IL may flow in directions other than what is illustrated. Thus, any directional references are made with regard to the orientation as shown in FIG. 1, and are not intended to limit a working embodiment to any particular orientation. In other embodiments, the low temperature 18 may be static with no flow at all. The low temperature 18 may make contact with the air electrode 12 at an air electrode/low temperature IL interface 24. The low temperature 18 may make contact with the metal electrode 14 at a metal electrode/low temperature IL interface 26. In alternative embodiments, the low temperature IL does not flow. That is, no mechanism for forced flow is included in the cell.

As alluded to above, a reduction half-reaction may take place at the air electrode 12. In an embodiment, an oxidizer 20 may be reduced through the reduction half-reaction at the air electrode 12. For non-limiting illustration purposes, the electrons from the metal electrode 14 may flow to an external circuit 22 (i.e., a load) and return to the air electrode 12 to facilitate the reduction of the oxidizer 20. The oxidizer 20 is reduced on the air electrode 12 at oxidizer reduction reaction sites 21. In an embodiment, a catalyst is used to facilitate the oxidizer reduction half-reaction at the oxidizer reduction reaction sites 21. The air electrode 12 may include catalyst material, such as manganese oxide, nickel, pyrolized cobalt, activated carbon, silver, platinum, or any other catalyst material or mixture of materials with high oxygen reduction activity for catalyzing reduction of the oxidizer, which will be discussed below. In an embodiment, the air electrode 12 may be porous and the porous body with a high surface area may comprise the catalyst material.

In an embodiment, the air electrode 12 may be a passive or "breathing" air electrode 12 that is passively exposed, such as through windows or openings to an oxidizer source (typically oxygen present in ambient air) and absorbs the oxidizer 20 for consumption in the electrochemical cell 10 reactions. That is, the oxidizer 20 will permeate from the oxidizer source into the air electrode 12. Thus, the oxidizer 20 need not be actively pumped or otherwise directed to the air electrode 12, such as via an inlet. Any part of the air electrode 12 by which the oxidizer 20 is absorbed or otherwise permeates or contacts the air electrode 12 may be generically referred to as an "input." The term input may broadly encompass all ways of delivering oxidizer to the air electrode 12 for the oxidizer reduction half-reaction at the oxidizer reduction reaction sites 21 on the air electrode 12.

By means of a non-limiting illustration, the air electrode 12 may be a gas permeable electrode having an outer surface exposed to ambient air such that the oxidizer 20 comprises oxygen that permeates the air electrode 12. Similarly, the air electrode 12 may comprise a barrier membrane on the outer surface of the air electrode 12 that is gas permeable and liquid impermeable so as to permit permeation of the oxidizer 20 via the outer surface of the air electrode 12 and prevent the low temperature 18 from flowing through the outer surface of the air electrode 12. In an embodiment, the air electrode 12 may be a porous body covered on the inner side by a liquid permeable layer through which the low temperature 18 may pass through so that the low temperature 18 may contact the porous body.

The relationship between the low temperature 18 and the air electrode 12 may impact the overall energy density of the electrochemical cell 10. For that reason, the vapor pressure and surface tension characteristics of the low temperature 18 in view of the air electrode 12 may be carefully selected. For instance, in an embodiment, the air electrode 12 may repel the low temperature IL so that it may prevent the low temperature 18 from wicking; that is, flowing in a capillary-like manner through the air electrode 12. In another embodiment, the air electrode 12 may be designed with porosity to absorb the low temperature IL so that it exposes the low temperature IL to more air electrode 12 surface area for purposes of enabling the desired electrochemical reactions at the air electrode 12. The air electrode 12 may support catalyst decoration at the oxidizer reduction reaction sites 21 to improve the efficiency of the reaction. In an embodiment, the catalyst may be decorated with metal ions which may enhance the activity of the catalyst in catalyzing the oxidizer reduction reaction at the oxidizer reduction reaction sites 21 on the air electrode 12. The air electrode 12 may have a high ionic conductivity to provide reactants and remove products of the oxidizer reduction reaction from the air electrode 12. In an embodiment, the air electrode 12 may have high electrical conductivity characteristics to carry electrons from the external load 22 to the oxidizer reduction reaction sites 21. The air electrode 12 and low temperature 18 characteristics may be further defined.

In an embodiment, the metal-oxide by-products 28 may be formed at the metal electrode 14. Whereas reduced oxidizer ions in an aqueous electrolyte coordinate, that is, donate electrons to water molecules to form water, peroxides and/or hydroxides, and thereby increase problems with vapor pressure and corrosion. In this non-limiting embodiment, the low temperature 18 may promote both the oxidizer reduction reaction at the air electrode 12 and the conduction of the reduced oxidizer ions to the metal electrode 14. In support of this result, the low temperature 18 may contain soluble species that interact with the reduced oxidizer ions, with the low temperature 18 typically being protic. The low temperature 18 may also support the reduced oxidizer ions as they migrate to the metal electrode 14. By means of a non-limiting illustration, the migration of the reduced oxidizer ions may refer to transport of the reduced oxidizer ions via convection transport, or conduction transport or diffusion transport. The low temperature 18 may also support the oxidized metal-fuel ions remaining at the metal electrode 14. In doing so, the low temperature 18 promotes the reaction between the reduced oxidizer ions and the oxidized metal-fuel ions to produce the metal-oxide by-products 28. In an embodiment, the metal-oxide by-products 28 may be stored at the metal electrode 14. In an embodiment where the metal-oxide by-product 28 is stored at the metal electrode 14, this embodiment is best used as a primary (i.e., non-rechargeable) battery, as the oxygen is stored at the metal electrode 14 and is not locally available to an oxygen evolving electrode for oxidation of the reduced oxygen species.

In another embodiment, the metal-oxide by-products 28 may be formed at the air electrode 12. In this non-limiting embodiment, the air electrode 12 catalyzes the oxidizer reduction reaction at the oxidizer reduction reaction sites 21 at the air electrode 12. In an embodiment, the low temperature 18 (typically aprotic) may be chemically compatible with pure metal or metal alloy, and high concentrations of the oxidized metal-fuel ions may exist in the low temperature IL 18. In another embodiment, metal ions are added to the electrolyte, which forms metal-oxide by products 28 at the air electrode 12. As discussed above, the added metal ions may or may not be of the same metal as the metal electrode. In another embodiment, the metal-oxide by-products 28 are stored locally at the air electrode 22. Because metal-oxide by-products 28 are formed and stored locally at the air electrode 12 during discharge, a ready supply of oxygen (present in the locally stored metal oxide) is locally available at the air electrode during recharge. In this manner, the reversibility of the cell can be improved. In contrast, where the oxides are stored in the ionic liquid electrolyte, the oxides are typically distributed throughout the electrolyte, and the amount of oxide available to the air electrode is limited to the electrolyte/air interface and rate at which the oxide can diffuse within the electrolyte to that interface.

The storage of the metal oxide locally at the air electrode is facilitated by the air electrode 12 having a pore size in at least the regions contacting the ionic liquid sufficient to contain the oxide within the air electrode 12 body. That is, the pore size may be dependent on the size of the oxide. A network of such pores may increase the storage capacity of the air electrode 12.

In another embodiment, the low temperature 18 may support solvating these oxidized metal-fuel ions at the metal electrode 14. That is, the low temperature IL ions may surround the metal-fuel ions, and in doing so, the low temperature 18 may help to maintain the metal-fuel ionic form as the solvated, oxidized metal-fuel ions migrate to the air electrode 12. Typically, the low temperature IL will be aprotic. By means of a non-limiting illustration, the migration of the solvated, oxidized metal-fuel ions may refer to transport of the solvated, oxidized metal-fuel ions via convection transport, or conduction transport or diffusion transport. Once at the air electrode 12, the solvated metal-fuel ions may react with the reduced oxidizer ions, and this reaction may result in metal-oxide by-products 28. In an embodiment, the metal-oxide by-products 28 may be stored at the air electrode 12.

In an embodiment, the metal-oxide by-product 28 may catalyze the oxidizer reduction reaction at the air electrode 12. In an embodiment, the electrochemical cell 10 may include a regenerative electrochemical cell and an oxygen recovery system. Examples of such devices are shown, for example, in U.S. patent application Ser. No. 12/549,617, filed on Aug. 28, 2009, which is incorporated herein by reference in its entirety.

In an embodiment, the oxidizer source is ambient air, and the oxidizer 20 is oxygen. In an embodiment, oxygen as the oxidizer 20 may be reduced at the air electrode 12 to form reduced oxygen ions. In an embodiment, the oxygen may be supplied from an evolved oxygen recovery system used in a regenerative electrochemical cell. Other examples of electrochemical cells that may be useful embodiments herein are shown, for example, in U.S. patent application Ser. No. 12/549,617, filed on Aug. 28, 2009, which is incorporated herein by reference in its entirety.

The electrolytes and/or conically conductive medium described herein may be used in other cell configurations. An alternate cell configuration, for example, comprises a compact wound cell illustrated in U.S. Patent Application Ser. No. 61/267,240, filed Dec. 7, 2009, and U.S. Pat. No. 8,895,197, which are hereby incorporated by reference in their entirety. All the layers (i.e., the electrodes and electrolyte layers or layers) may be flexible (either by being a flexible solid or semi-solid or being a liquid which is inherently conformable and thus may be considered flexible) to enable the cell to be configured in a wound, folded or other non-linear arrangement with the outer surface of the air electrode exposed for absorbing oxygen. A flexible, insulating air-permeable separator may be positioned between the outer surface of the fuel and air electrodes to maintain spacing therebetween and permit air to permeate to the outer surface of the air electrode. The separator may be of any configuration, including a lattice, ribbed structure, etc.

FIG. 4 illustrates a method according to an embodiment. This embodiment includes the steps of mixing metal ions with an ionic liquid to create a solution comprising a metal ion-negative ion complex 102, exposing the solution to oxygen 104 and electrochemically reducing the oxygen 106. Optionally, the process may include one or more of the following steps: forming metal-oxide by-products at a metal fuel electrode 108, storing the metal-oxide by-products at the metal electrode 110, forming a metal-oxide by-product at an air electrode 112, or storing the metal-oxide by-products at the air electrode 114.

Thus, it can be seen that an additive in the low or room temperature ionic liquid may provide cations (positive ions) for enhancing the oxygen reduction reaction in various ways. As mentioned above, the cation may be a metal ion that coordinates with one or more negative ions in the ionic liquid to form a metal ion-negative ion complex that improves oxygen reduction thermodynamics and/or kinetics, or promotes the formation and storage of oxides of the metal fuel at the air electrode. Under conditions where ORR is occurring, a high concentration of metal ions near and within the cathode provides for the complexing of the reduced oxygen species and the subsequent precipitation of those species, thereby promoting the formation and storage of oxides at the air electrode. The additive may also be water, which provides its positive ions ($H^+$) for the same purposes. Water may be added in advance, or may be absorbed as water vapor through the air electrode via its natural absorption characteristics. Thus, in embodiments where the additive improves oxygen reduction thermodynamics and/or kinetics, the additive may be referred to as an oxygen reduction enhancing additive, which could be a metal containing additive, water, or another additive that provides a positive cation for coordinating with the negative ion of the ionic liquid for the same purpose. Similarly, in embodiments where the additive promotes the formation and storage of oxides of the metal fuel at the air electrode during discharge, the additive may be referred to as a local oxide formation promoting additive, which also may be a metal containing additive, water, or another additive that provides a positive cation for coordinating with the negative ions of the ionic liquid for the same purpose. The functionality of an oxygen reduction enhancing additive and a local oxide formation enhancing additive are not mutually exclusive, and the same additive may provide both functionalities. Accordingly, a local oxide formation enhancing additive can also be an oxygen reduction enhancing additive.

Whether water content is desired in the ionic liquid may be dictated by the reactivity of the metal fuel used, particularly if the ionic liquid contacts the fuel electrode. For example, if the metal is highly reactive, in some embodiments water may cause self-discharge (i.e., metal oxidation and hydrogen evolution at the fuel electrode), and thus it may be preferred to avoid or minimize any water content and have the ionic liquid be highly hydrophobic. Such highly reactive metals may be those metals in Groups I-VI, XIII and XIV of the periodic table. For less reactive metals, such as those in Groups VII-XII of the periodic table, the benefits of water content may outweigh the negatives in some embodiments and thus water content may be used. An advantage of water content is that it can be replenished by absorption of water vapor through the air electrode, whereas a metal additive may precipitate out over extended periods of time and require replenishment.

In various embodiments the ionically conductive medium between the fuel and air electrodes (and the charging electrodes, if a separate one is used) may have multiple layers, instead of having the ionic liquid contact each of the electrodes as illustrated. For example, two ionic liquids separated by an interface, such as a membrane, or an ionic liquid and a semi-solid electrolyte may be used. Other configurations may be used as well.

Additives in IL

As described above, the ionically conductive medium can comprise at least one oxygen reduction enhancing compound. In one embodiment, such a compound can be seen as an "additive," as its amount is generally smaller than the amount of the ionic liquid(s) in the ionically conductive medium. For example the ratio of the concentration of the additive to ionic liquid can be at least about 1:1000, such as at least about 1:500, such as at least about 1:100, such as at least about 1:10, such as at least about 1:5, such as at least about 1:1.

In some embodiments, such a compound can also be a (local) oxide formation promoting compound, as it can increase the formation and storage of oxides of the metal fuel at the air electrode during discharge relative to the ionic liquid without the local oxide formation promoting compound. In one embodiment, a local oxide formation promoting compound/additive can be added to an ionically conductive medium, the additive dissolving in the medium to form local oxide formation promoting positive ions. Similar to an oxygen reduction enhancing compound, the positive ions of the local oxide formation promoting compound are coordinated with one or more negative ions forming local oxide formation promoting positive ion-negative ion complexes. The oxygen reduction enhancing compound described herein can be any of such compounds aforedescribed.

One surprising advantage of adding an oxygen reduction enhancing compound is to improve oxygen reduction thermodynamics, kinetics, or both. In one embodiment, the compound dissociates into positive ions that coordinate with at least one negative ion to form a positive-negative complex. The complex can have a large effect on the turn-on potential, half-wave potential, and/or the current density at the half-wave potential. Depending on the additive, the reversibility of the reaction may also be affected.

For example, in one embodiment, the oxygen reduction enhancing positive-negative ion complex can produce a shift of greater than or equal to about 200 mV in the turn-on potential for oxygen reduction versus the ionic liquid without the added oxygen reduction enhancing compound. The shift can be greater than or equal to about 100 mV, about 150 mV, about 240 mV, about 300 mV, about 350 mV, about 400 mV, about 500 mV, or more.

In one embodiment, the oxygen reduction enhancing positive-negative ion complex can produce an increase in the current density at the half-wave potential versus the ionic liquid without the oxygen reduction enhancing compound. The current density can also be maintained at substantially the same value before the addition of the additive.

In another embodiment, the oxygen reduction enhancing positive-negative ion complex can produce a shift of greater than or equal to about 1 V in the half-wave potential for oxygen reduction versus the ionic liquid without the added oxygen reduction enhancing compound. The shift can be greater than or equal to about 0.1 V, about 0.5 V, about 1 V, about 1.5 V, about 2 V, about 2.5 V, or more.

Depending on the additive, the proton in an additive may improve oxygen reduction thermodynamics, kinetics, or both, relative to the ionically conductive medium without the protic ionic liquid. In one embodiment, the presence of a proton can increase the formation and storage of oxides of the metal fuel at the air electrode during discharge relative to the ionically conductive medium without the protic ionic liquid.

The ionically conductive medium in the aforedescribed electrochemical cell can comprise more than one IL. In one embodiment, the ionically conductive medium can comprise at least one aprotic IL and at least one protic liquid that comprises at least one available proton per ion pair. For example, the medium can comprise one, two, three, four, or more, aprotic ILs, alone or together with one, two, three, four, or more, protic ILs. The protic IL can comprise at least one available proton per ion pair. For example, in a case wherein at least one protic IL is added to an aprotic IL, because the amount of the protic IL is smaller than that of the aprotic, the protic IL can be seen also as an additive, as described above.

The two (or more) ionic liquids can be mixed together to create an ionically conductive medium, which can be one of those described above in an electrochemical cell. In particular, the medium is exposed to gases, such as oxygen gas, to allow electrochemical reduction of oxygen to begin. Note that an oxygen reduction enhancing compound can be similarly mixed with at least one ionic liquid to form an ionically conductive solution/medium as well.

The amount of the protic and aprotic ILs in the ionically conductive medium can vary depending on the chemistry of the medium. For example the ratio of the concentration of the protic ionic liquid to the aprotic ionic liquid is at least about 1:1000, such as at least about 1:500, such as at least about 1:100, such as at least about 1:10, such as at least about 1:5, such as at least about 1:1. Alternatively, the amount of protic IL can be larger than that of the aprotic IL. For example, the ratio of protic to aprotic ILs can be at least 1:0.5, such as at least 1:0.1, such as at least 1:0.05, such as at least 1:0.01.

As aforedescribed, the protic IL can comprise at least one cation that comprises at least one reversible proton. The pKa of the proton of the protic source (additive) can depend on the protic source. The term "pKa" can be appreciated by one of ordinary skill in the art to refer to logarithmic measure of the acid dissociation constant. A strong acid, for example, can have a pKa value of less than about −2. In one embodiment, the protic ionic liquid comprises at least one cation comprising at least one reversible proton with a pKa smaller or equal to 16, such as smaller or equal to 14, such as smaller or equal to 12, such as smaller or equal to 10, such as smaller or equal to 8, such as smaller or equal to 6, such as smaller or equal to 4, such as smaller or equal to 2. The pKa can also be a negative number. For example, the pKa can be smaller than or equal to −2, such as smaller or equal to −4, such as smaller or equal to −6, such as smaller or equal to −8, such as smaller or equal to −10, such as smaller or equal to −12.

The descriptions provided herein can be readily applied to a Lewis acid system, which may drive cell chemistry for highly reactive metals. Note that the embodiments provided herein can also be applied to a Lewis base system.

NON-LIMITING WORKING EXAMPLES

Figures 5A, 5B:
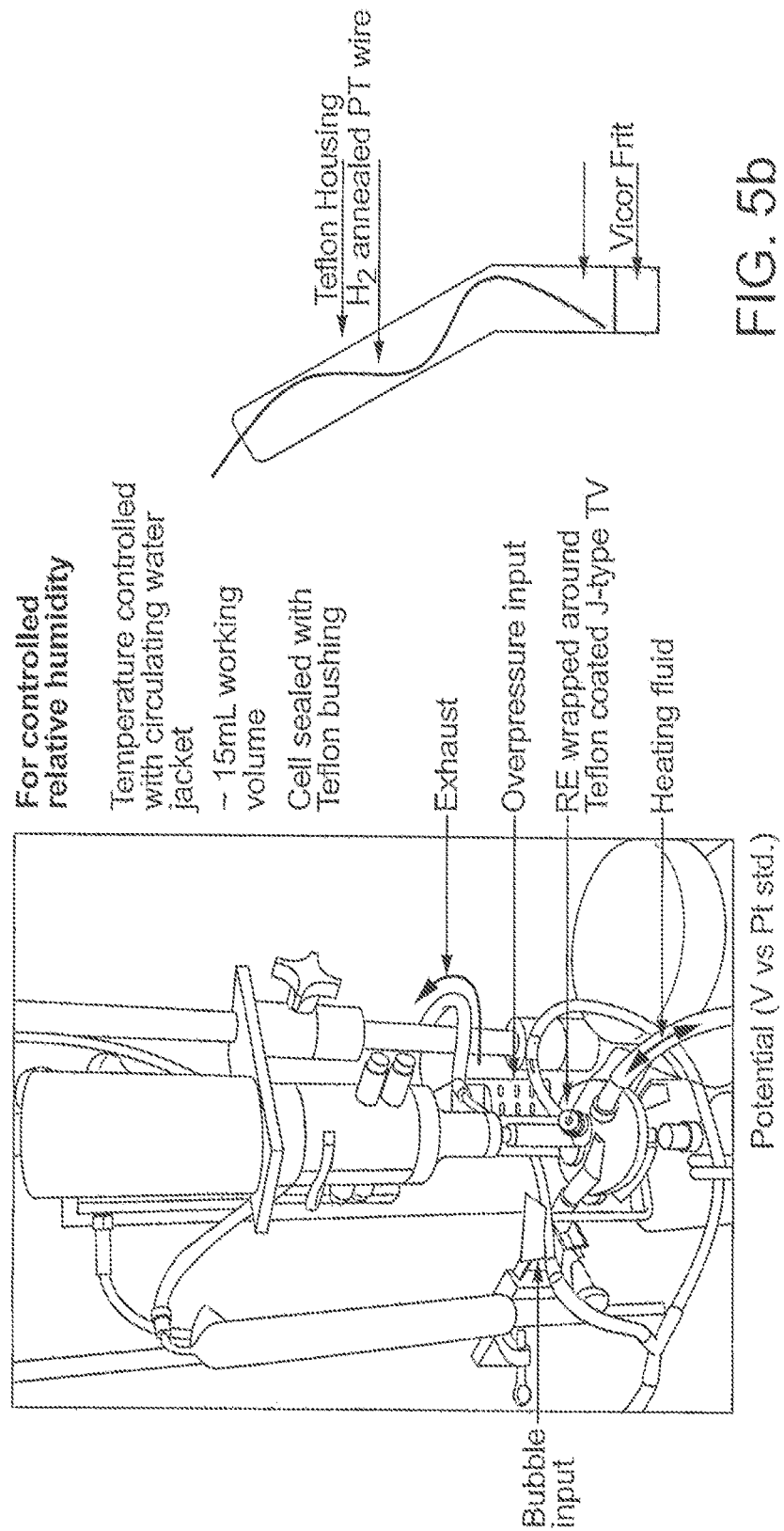
FIG. 5(a) shows a photograph of an experimental setup in one embodiment.
FIG. 5(b) shows a cartoon of a close-up of the measurement tube/chamber.
Figure 5E:
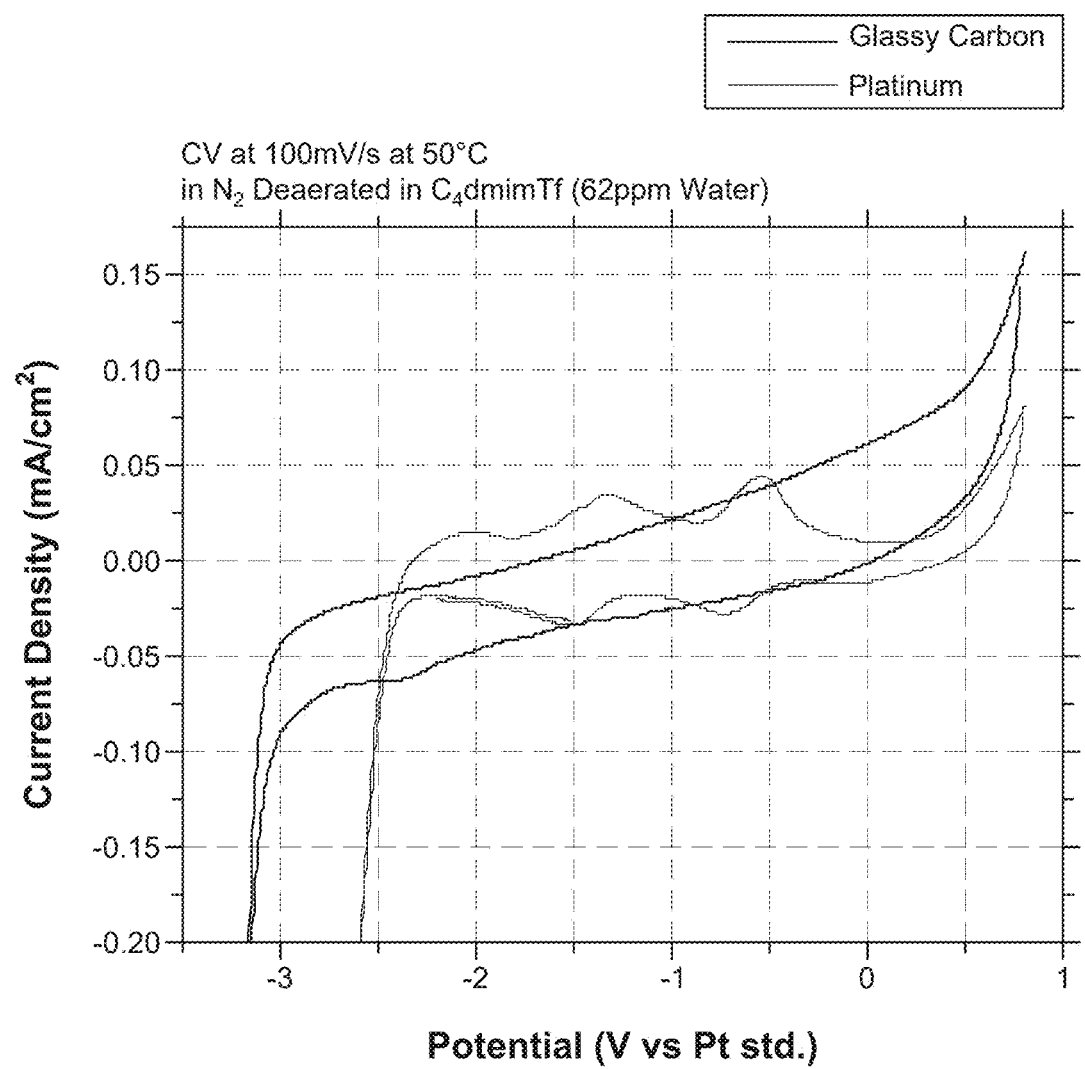
FIGS. 5(e)-(f) show additional background ORR analysis data regarding linear sweep voltammetry (LSV) at 10 mV/s in N2 deaerated with 62 ppm water for BDMelm:Tf and some properties thereof, respectively.
Figure 5F:
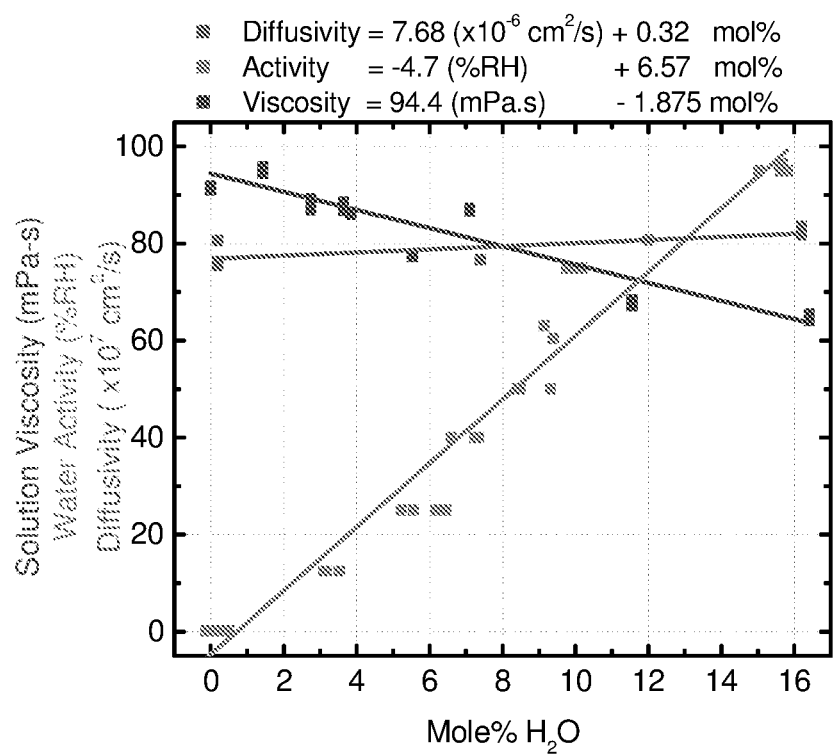

A series of protic additives were added into an ionically conductive medium in order to examine the effects of such additives upon oxygen reduction reaction ("ORR"). An aprotic ionic liquid BdMelm:Tf was used as the host for the additive. A photograph of an experimental setup is provided in FIG. 5($a$), with FIG. 5($b$) showing a cartoon of a close-up of the measurement tube/chamber. This particular IL was chosen for its electrochemical air, and water stability of its ions and that the protonation of superoxide in BM1m was observed even in very dry systems. For example, BDMelm Tf has a melting point of about 35° C., density of about 1.4 g/mL, and oxygen solubility of about 2.5 mM, as measured gravimetricallty and through Cottrell, diffusivity of about $7.5 \times 10-6$ cm2/s as measured for dry ORR on glassy carbon (GC) and with Cottrell. See e.g., FIG. 5($f$). Also, the IL had the benefit of the superacidity of Tf, which minimizes solvent leveling effects. Additional benefits of this dry aprotic IL system include also invariant electrode, high reversibility, and high reactivity, as shown in cyclic voltammagrams (CV) in FIG. 5(c) and the result of the Kouteeky-Levich ("L-K") analysis with respect to the number of electrons per $O_2$ vs. potential in FIG. 5(d). Additional background ORR analysis data regarding linear sweep voltammetry (LSV) at 10 mV/s in $N_2$ deaerated with 62 ppm water for BDMelm:Tf (to be used as blank, control data) are shown in FIG. 5(e).

Figure 6:
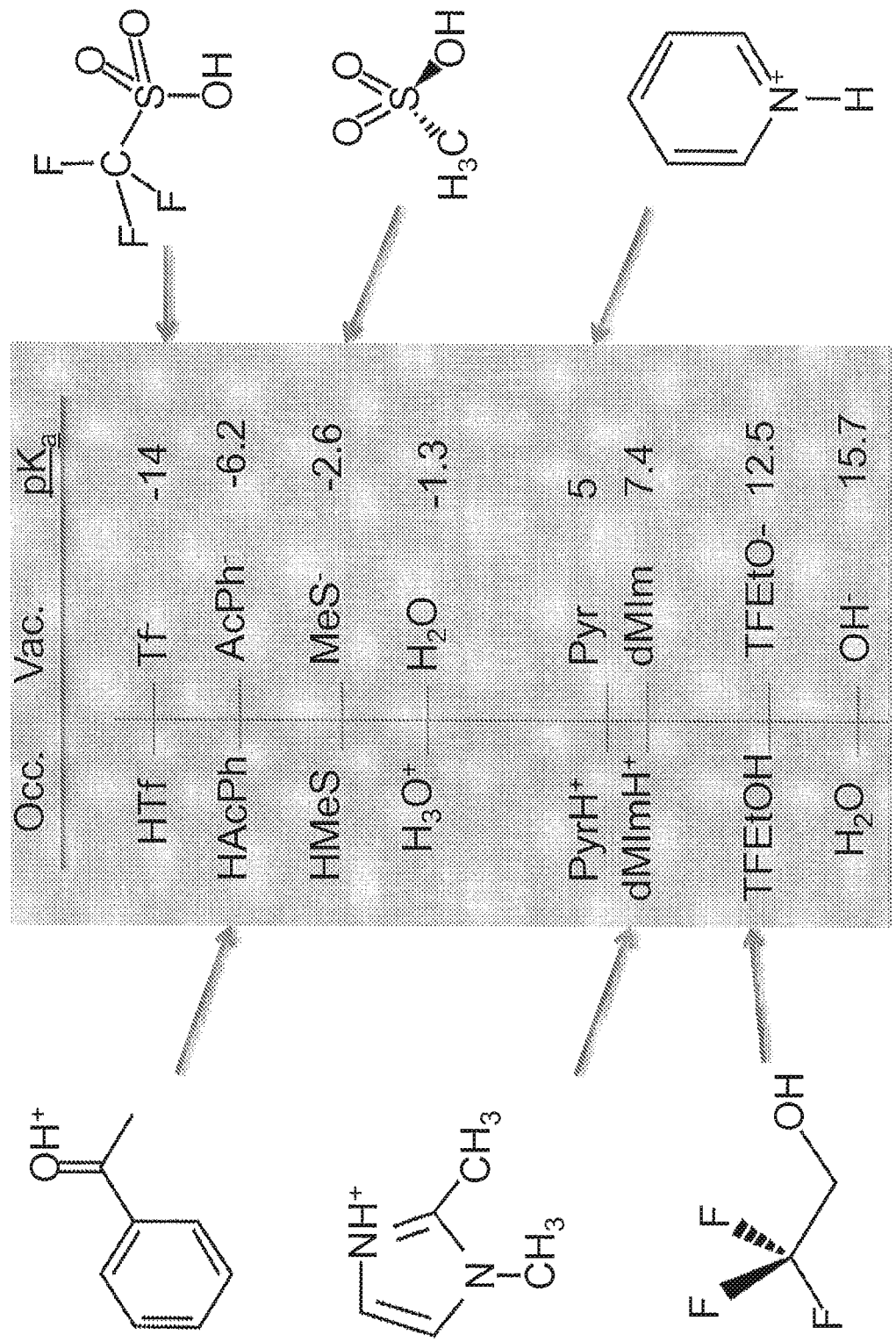
FIG. 6 shows protic additives and their associated pKa's as observed in one embodiment.

A range of protic additives were then titrated, and electrochemical ORR analysis on each system was subsequently performed. Table 1 shows a summary of the results related to these additives. As shown in Table 1, the pKa value of the series ranged from about 16 to about −14. These are also shown on FIG. 6.

It was found that the reactions involving triflic acid (HTf), benzonitrile: HTf, acetophenone: HTf, methanesulfonic acid, hydronium triflate, pyridazinium triflate involved a four-electron transfer. The reactions involving acetic acid, pyridinium triflate, 1,2-dimethylimidaozlium triflate, n,n-diethyl-n-methylammonium triflate involved a two-electron transfer. Finally, the reaction involving water involved an one-electron system.

TABLE 1 pKa values of different Proton Sources

| Proton Source | pKa (H20) |
|---|---|
| triflic acid ("HTf") | −14 |
| benzonitrile: HTf | −10 |
| acetophenone: HTf ("MAcPh") | −6.2 |
| methanesulfonic acid "(HMeS") | −2.6 |
| hydronium triflate ("$H_3O^+$") | −1.7 |
| pyridazinium triflate | 2.1 |
| acetic acid | 4.76 |
| pyridinium triflate ("$PyrH^+$") | 5.21 |
| 1,2-dimethylimidaozlium triflate ("$dMImH^+$") | 7.4 |
| n,n-diethyl-n-methylammonium triflate | 10.6 |
| 2,2,2-trifluoroethanol ("TFEtOH") | 12.5 |
| 2-butyl-1,1,3,3-tetramethylguanidinium triflate | 13.6 |
| water | 15.7 |

Figure 7A:
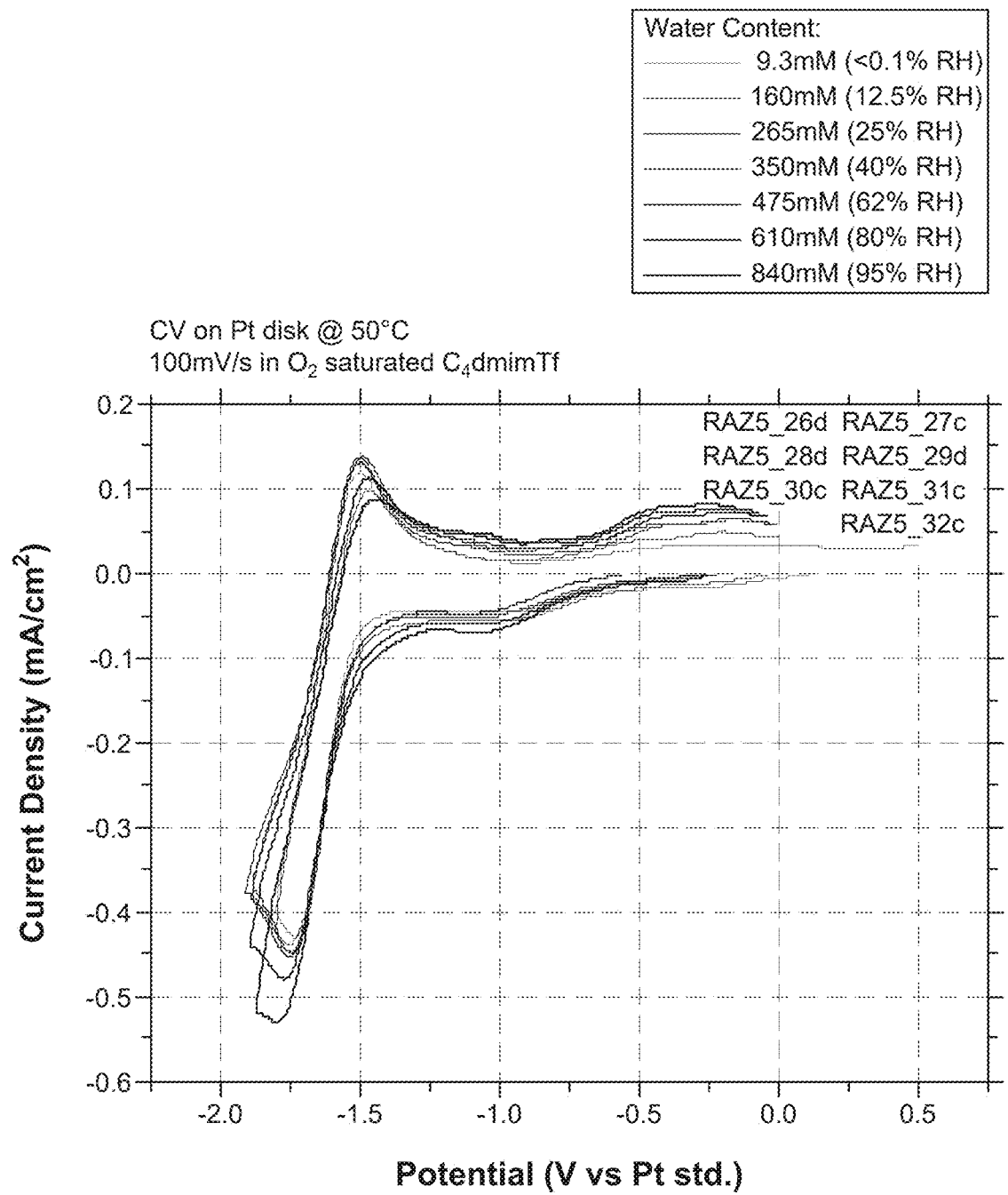
FIGS. 7(a)-7(b) show cyclic voltammograms of the embodiment with water as an additive on Pt (7(a)) and glassy carbon ("GC") disk (7(b)) at 50° C.
Figure 7B:
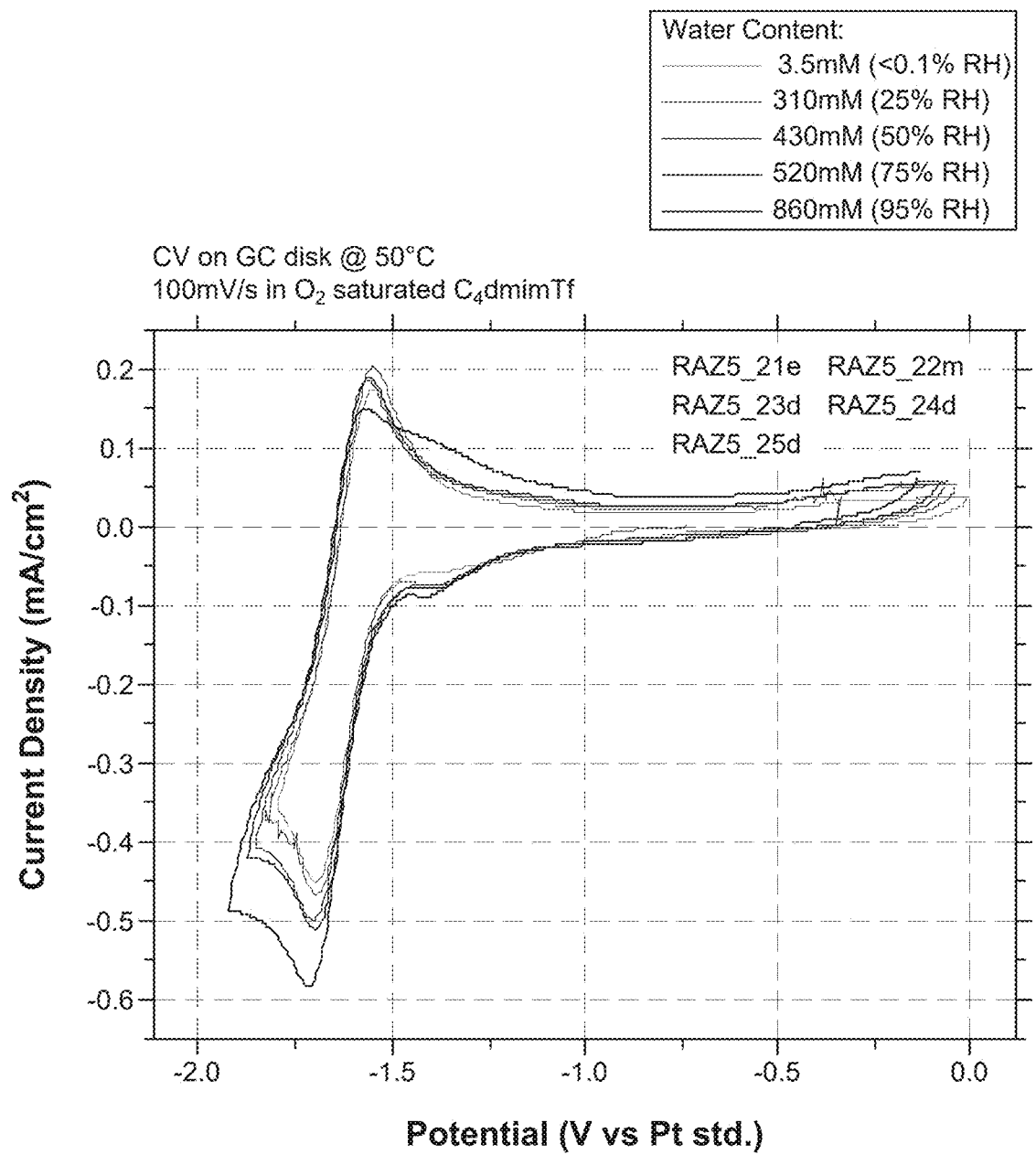
Figure 7C:
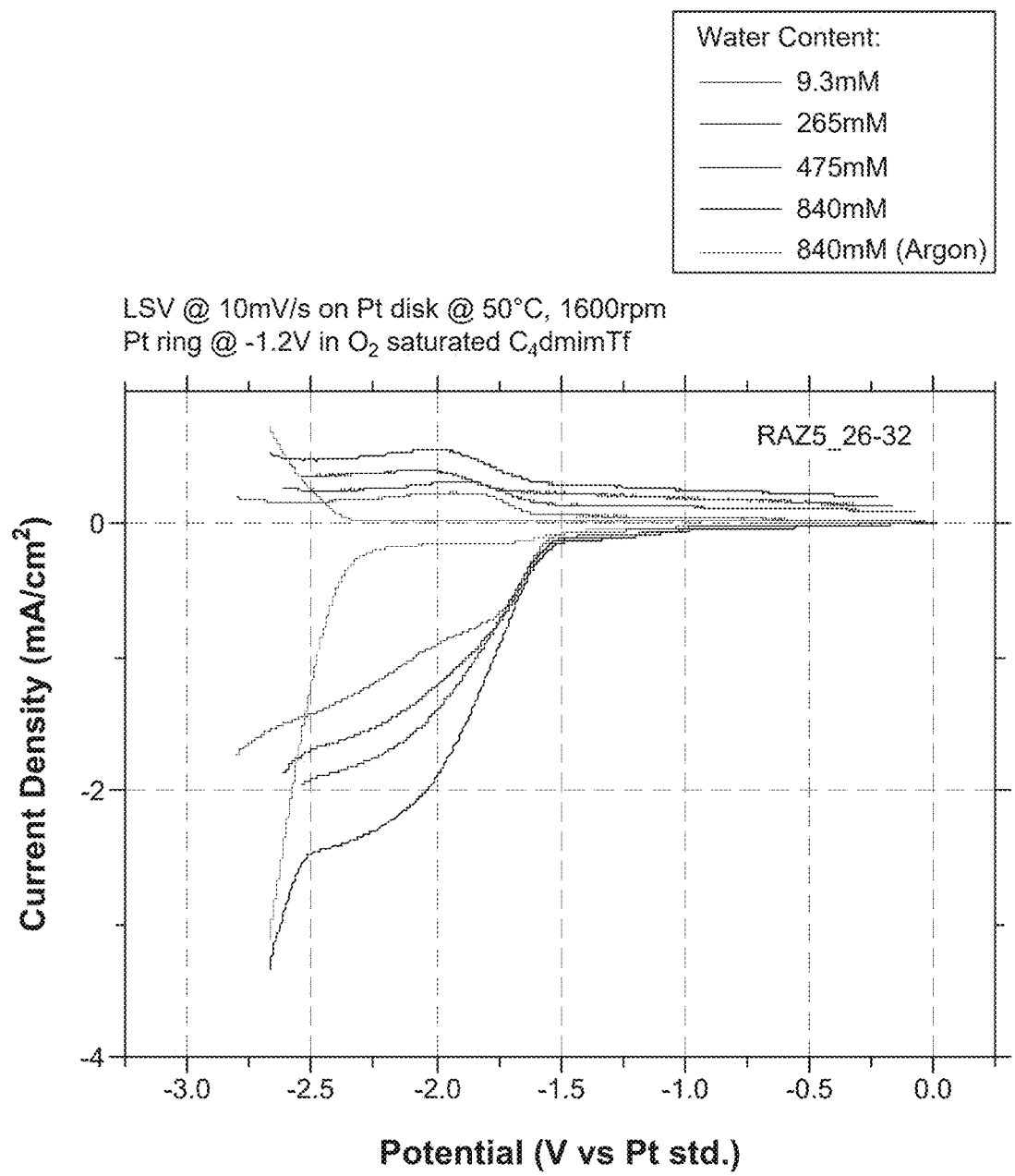
FIGS. 7(c)-(d) show additional data regarding LSV at 10 mV/s on both Pt disk (7(c)) and GC disk (7(d)) at 50° C.
Figure 7D:
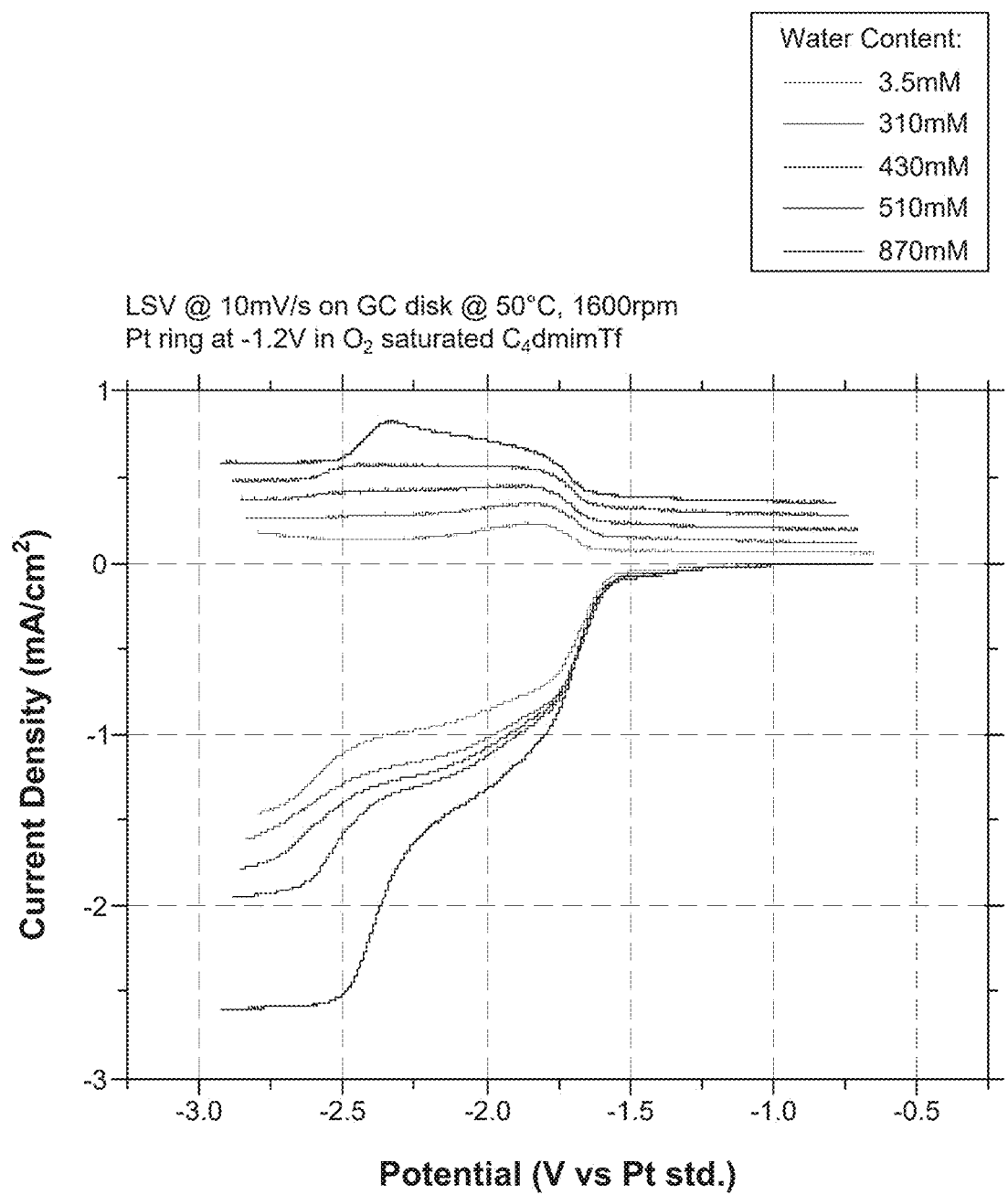
Figure 7E:
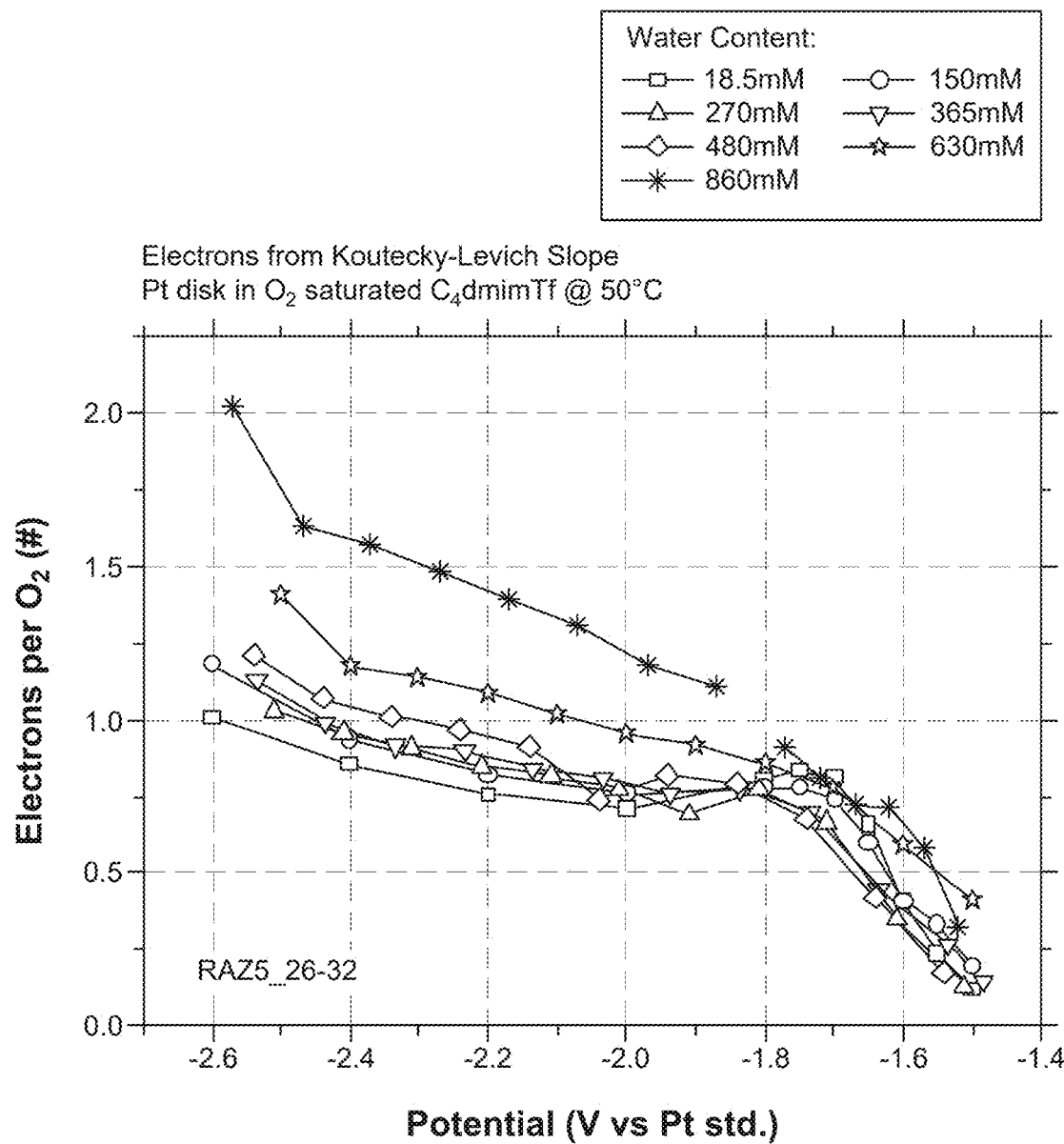
FIGS. 7(e)-(f) show the results of Koutecky-Levich ("L-K") analysis with respect to the number of electrons per 02 vs. potential for Pt disk (7(e)) and GC disk (7(l))
Figure 7F:
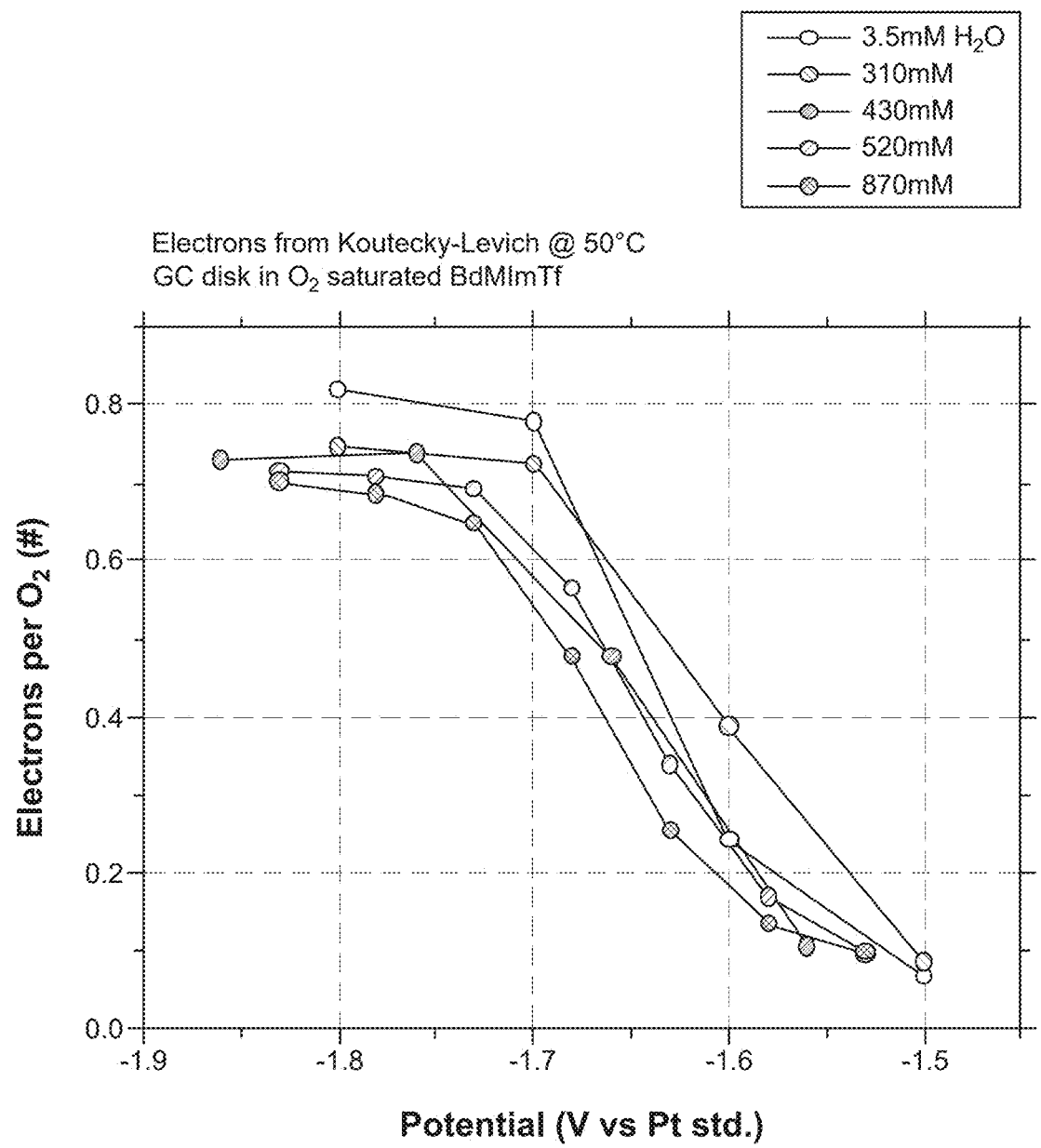

FIGS. 7(a)-7(b) show cyclic voltammograms of the embodiment with water as an additive on Pt (7(a)) and glassy carbon ("GC") disk (7(b)) at 50° C. A series of water content was studied, with the highest concentration being about 850 mM (about 1 $H_2O$ per 5 BdMelm Tf). FIGS. 7(c)-7(d) show additional data regarding LSV at 10 mV/s on both Pt disk (7(c)) and GC disk (7(d)) at 50° C. FIGS. 7(e)-7(f) show the results of L-K analysis with respect to the number of electrons per $O_2$ vs. potential for Pt disk (7(e)) and GC disk (7(f)). It was found that even at large concentrations of water, superoxide is dominant.

Figure 8A:
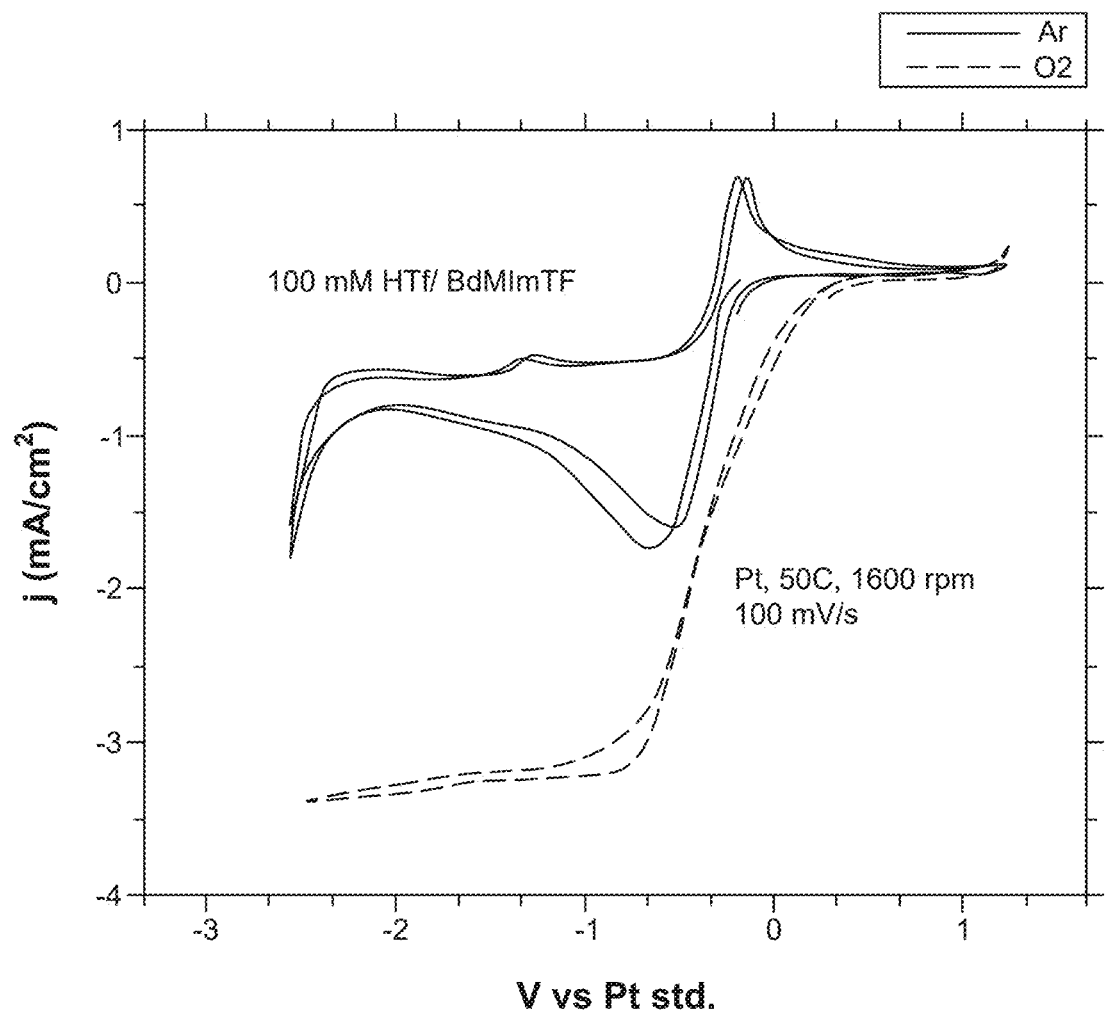
FIGS. 8(a)-8(c) show cyclic voltammograms of the embodiment with HTf as the protic additive.
Figure 8B:
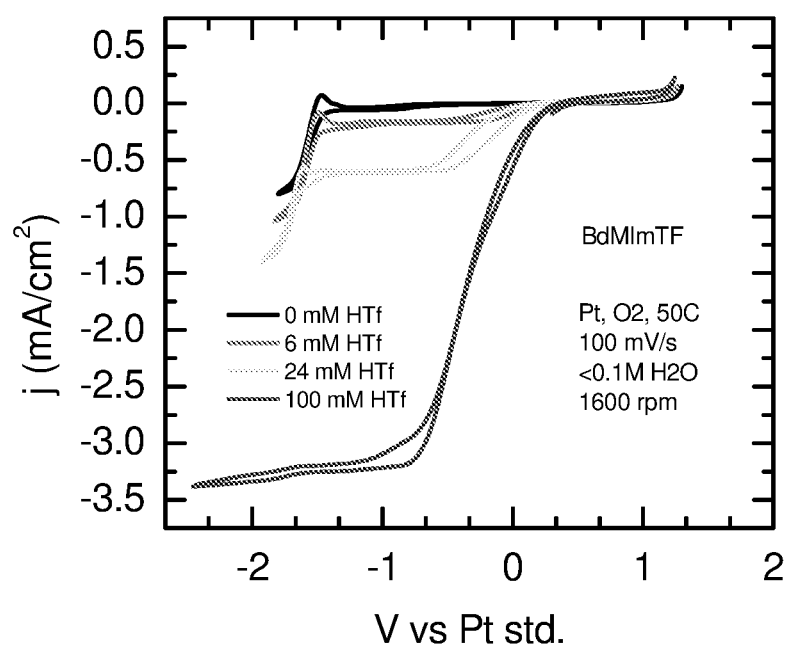
Figure 8C:
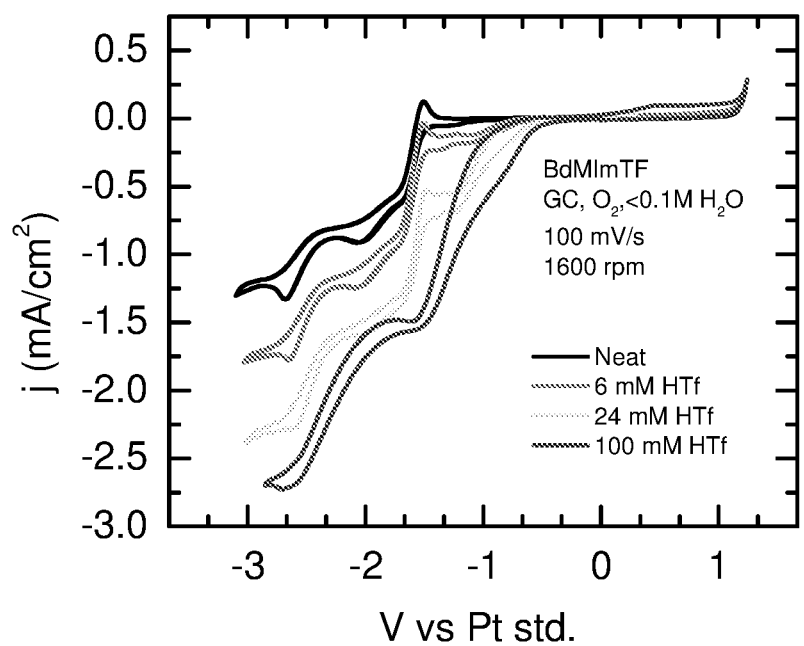

FIGS. 8(a)-8(c) show cyclic voltammogram of the embodiment with HTf as the protic additive. It was found that there was a shift of greater than 1V in at the half-wave potential for the oxygen reduction reaction. A loss of reversibility was also seen. FIGS. 8(d)-8(e) show the results of the K-K analysis. It was observed that on Pt disk a four-electron reaction was involved when HTf is 100 mM, while on GC disk, a two-electron reaction in the first reduction was involved.

Figure 9:
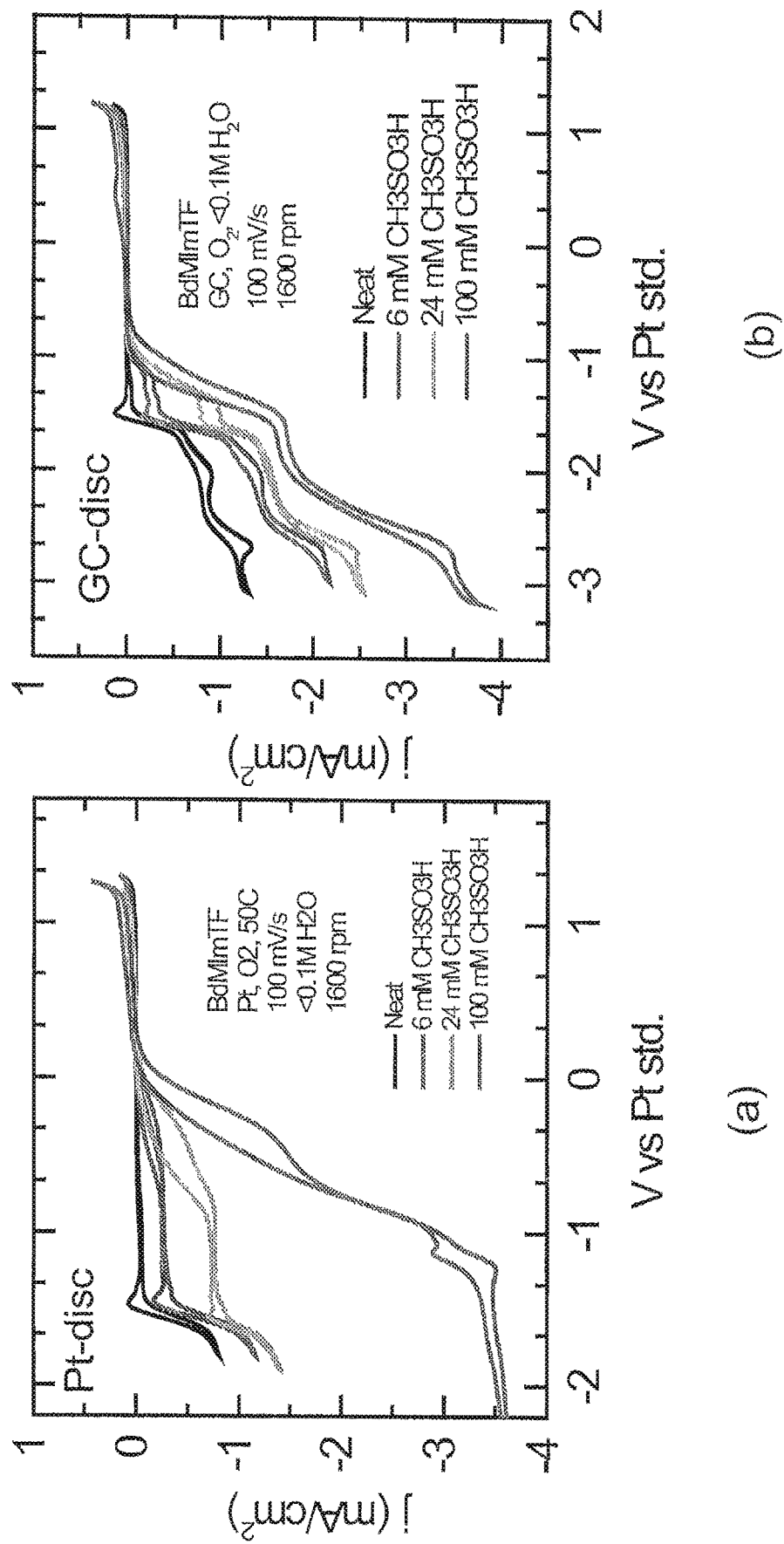
FIGS. 9(a)-9(b) show cyclic voltammograms of the embodiment with HMeS as the protic additive.
FIGS. 9(c)-9(d) show the results of the L-K analysis.

FIGS. 9(a)-9(b) show cyclic voltammogram of the embodiment with HMeS as the protic additive, FIGS. 9(c)-9(d) show the results of the L-K analysis. It was found that the results were similar to those as shown in FIG. 8. There was a shift of greater than 1V in at the half-wave potential for the oxygen reduction reaction. A loss of reversibility was also seen.

Figure 10:
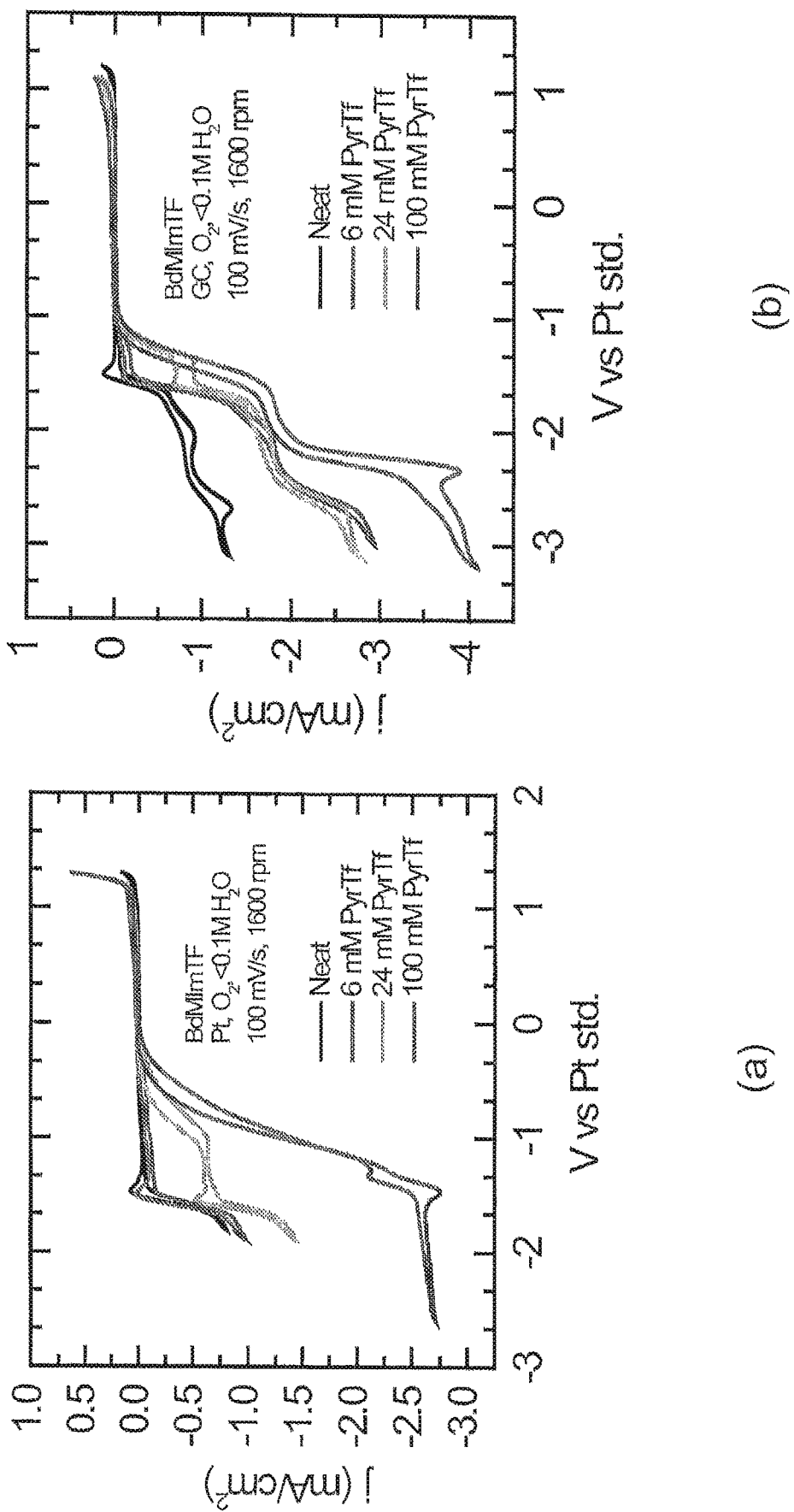
FIGS. 10(a)-10(b) show cyclic voltammograms of the embodiment with PryH$^+$ as the protic additive.
FIGS. 10(c)-(d) show the results of the L-K analysis.
Figure 10:
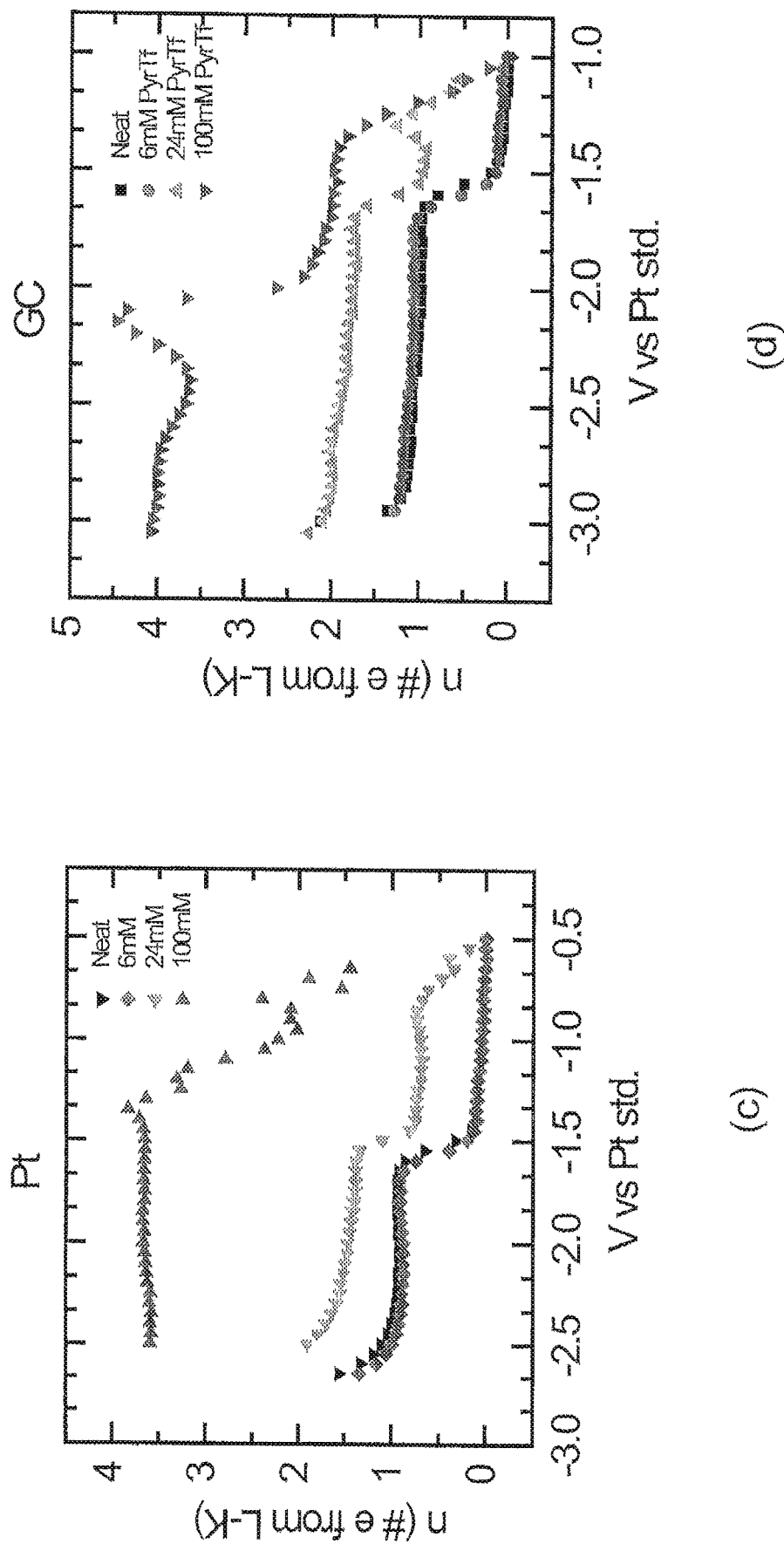

FIGS. 10(a)-10(b) show cyclic voltammogram of the embodiment with HMeS as the protic additive. FIGS. 10(c)-10(d) show the results of the L-K analysis. It was observed from the L-K analysis that a weak acid produced a four-electron ORR in both Pt and GC disk. FIGS. 11(a)-11(b) show the results of the L-K analysis in the embodiment with TFEtOH as the protic additive. It is seen from the Figure that only ORR involving two-electron transfer was observed.

Figure 11:
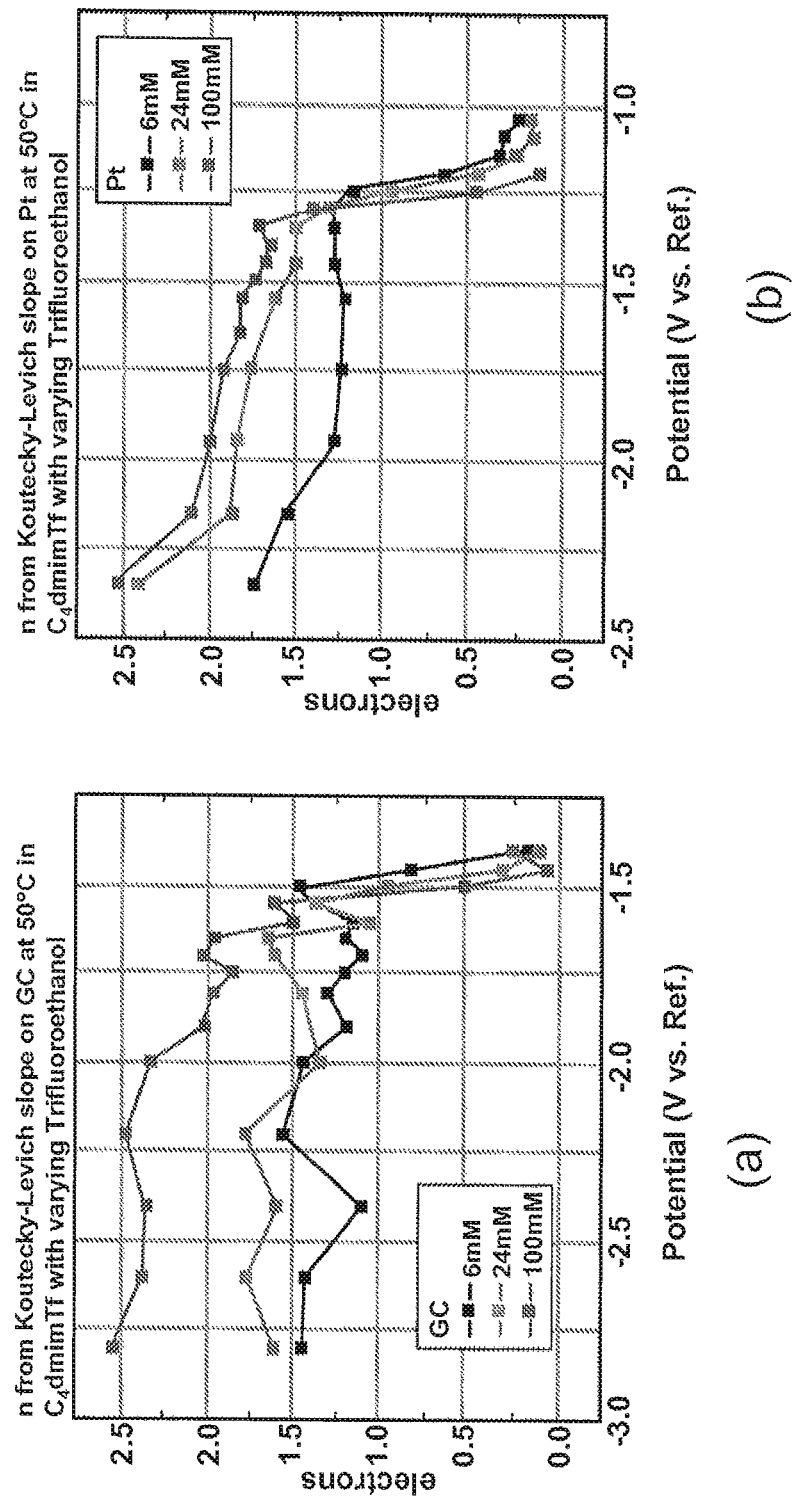
FIGS. 11(a)-11(b) show the results of the L-K analysis in one embodiment with TFEtOH as the protic additive.
Figure 12:
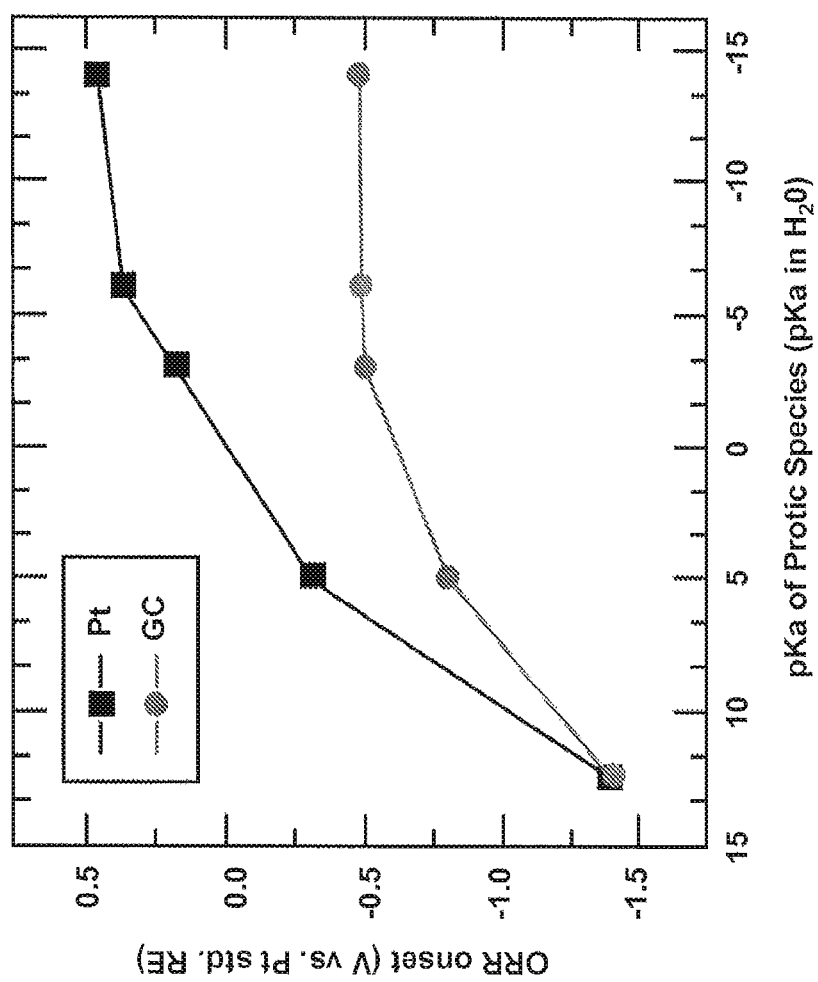
FIG. 12 shows the solvent leveling effects as observed in the oxygen reduction reaction onsets versus pKa of the protic additive in water for both Pt and GC disks.

FIG. 12 shows the solvent leveling effects as observed in the oxygen reduction reaction onsets versus pKa of the protic additive in water for both Pt and GC disks. As shown in FIG. 11, the Pt generally had a higher ORR onset voltage than GC. Also, the ORR onset voltages increase with increasing pKa, but appeared to level off at least for GC when pKa reaches between 0 and −5.

Figure 13:
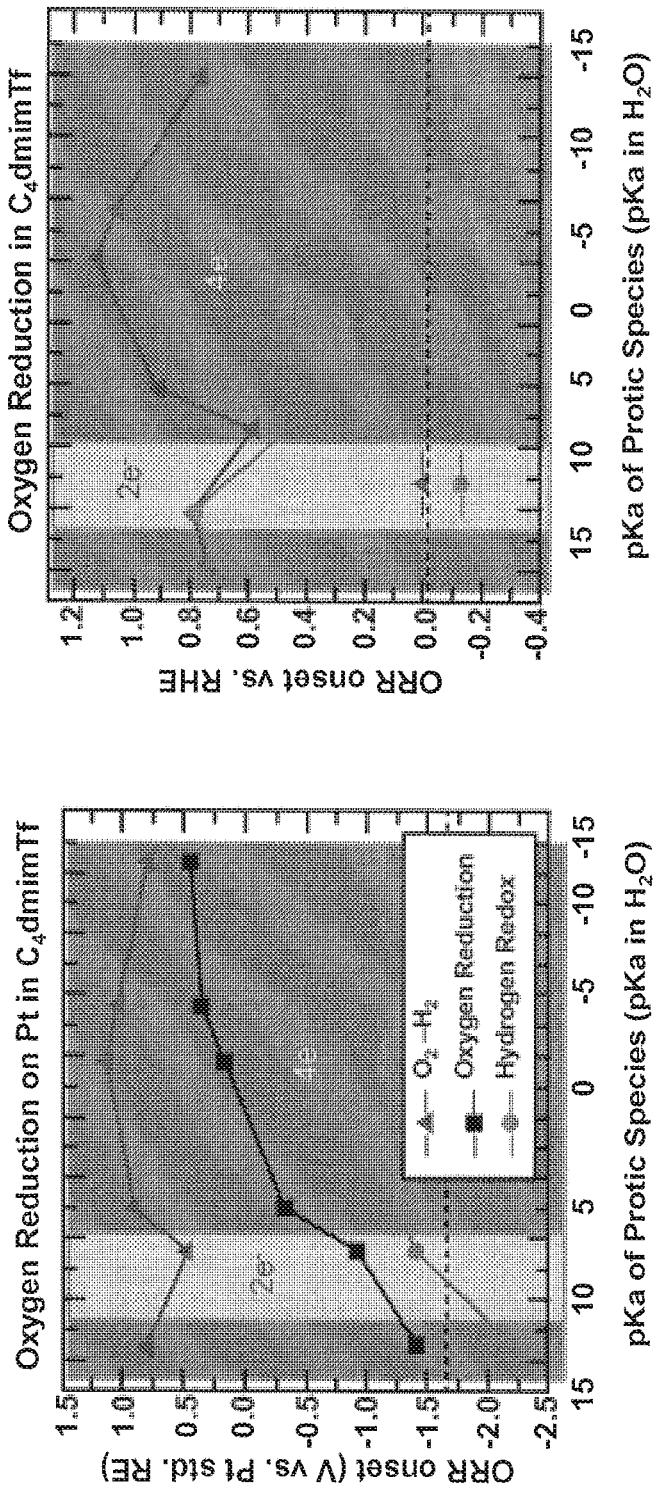
FIGS. 13(a)-13(b) show the oxygen reduction reaction turn-on potential as a function of pKa for Pt and GC.

FIGS. 13(a)-13(b) show the oxygen reduction reaction turn-on potential as a function of pKa for Pt and GC. It was noted that there was 100 mV error in estimated RE shift between deaerated and $O_2$ saturated IL with hydrogen redox potential. Hydrogen potential was defined was $(E_{1/2}+E_{1/2})/2$ for cathodic and anodic sweeps. ORR turn-on potential was taken from Tafel plot CV at 100 m/s and 1600 rpm during cathodic sweep.

The results show that oxygen reduction reaction was tunable to products that range from superoxide (neat, water, and low protic additive contents), to peroxide (TFEtOH), to four-electron with more acidic species. It was found that the protic additive source and pKa affected the reaction mechanism of the oxygen reduction reactions. It was found that increasing the amount of water as an additive (up to ~1M) in this experiment appears to have little effect on the oxygen reduction reaction behavior. It was postulated that hydrogen-bonding at these concentrations (still only ⅕ per ion pair) prevented it from acting as bulk water. Organic salts were found to have an impact at much lower concentrations. Finally, no observable change was observed for pKa's below −2.5, suggesting substantial solvent leveling effects in the BdMelm Tf IL.

The foregoing description has been presented for purposes of illustration and description. It is not intended to be exhaustive or to limiting to the precise form disclosed, and modifications and variations are possible in light of the above teachings or may be acquired from practice of the invention. The drawings and description were chosen in order to explain the principles of the invention and its practical application. It is intended that the scope of the invention be defined by the claims appended hereto, and their equivalents.

The articles "a" and "an" are used herein to refer to one or to more than one (i.e., to at least one) of the grammatical object of the article. By way of example, "a polymer resin" means one polymer resin or more than one polymer resin. Any ranges cited herein are inclusive. The terms "substantially" and "about" used throughout this Specification are used to describe and account for small fluctuations. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%.

What is claimed:

1. A method comprising:
   mixing a protic ionic liquid with an aprotic ionic liquid to create an ionically conductive medium comprising negative ions and positive ions, wherein at least one of the positive ions is a proton;

exposing the ionically conductive medium to oxygen; and electrochemically reducing the oxygen, wherein the ionically conductive medium further comprises a metal-containing additive and a protic organic molecule containing additive selected from the group consisting of triflic acid (HTf), benzonitrile: HTf, acetophenone: HTf, methanesulfonic acid, hydronium triflate, pyridazinium triflate, acetic acid, pyridinium triflate, 1,2-dimethylimidaozlium triflate, n,n-diethyl-n-methylammonium triflate, 2,2,2-trifluoroethanol, 2-butyl-1,1,3,3-tetramethylguanidinium triflate, and combinations thereof.

2. The method of claim 1, wherein the electrochemically reducing the oxygen occurs with improved oxygen reduction thermodynamics, kinetics, or both, relative to electrochemical oxygen reduction in the ionically conductive medium without the protic ionic liquid.

3. The method of claim 1, wherein the oxygen is electrochemically reduced using a catalyst.

4. The method of claim 1, wherein the electrochemically reducing the oxygen occurs in an electrochemical cell.

5. The method of claim 1, wherein the aprotic ionic liquid comprises at least one cation that has at least one strongly bound proton.

6. The method of claim 1, wherein the protic ionic liquid comprises at least one cation comprising at least one reversible proton with a pKa smaller than or equal to 16.

7. The method of claim 1, wherein the presence of the proton enhances reversibility of an air cathode of the metal-air ionic liquid battery.

8. The method of claim 1, wherein at least one of the protic ionic liquid and aprotic ionic liquid is a low temperature ionic liquid.

9. The method of claim 1, wherein at least one of the protic ionic liquid and aprotic ionic liquid is a room temperature ionic liquid (RTIL).

10. The method of claim 1, wherein the electrochemically reducing the oxygen occurs in a metal-air ionic liquid battery comprising a metal electrode and an air electrode.

11. The method of claim 1, further comprising flowing the low temperature ionic liquid in a gap between a metal electrode and an air electrode.

12. The method of claim 1, further comprising forming metal-oxide by-products at a metal fuel electrode.

13. The method of claim 1, further comprising storing the metal-oxide by-products at a metal electrode.

14. The method of claim 1, further comprising forming metal-oxide by-products at an air electrode.

15. The method of claim 1, wherein the ratio of the concentration of the protic ionic liquid to the aprotic ionic liquid is at least about 1:100.

16. The method of claim 1, wherein the presence of the proton produces a shift of greater than or equal to 200 mV in the turn-on potential for oxygen reduction versus the ionically conductive medium without the at least one protic ionic liquid.

17. The method of claim 1, wherein the presence of the proton produces an increase in the current density at the half-wave potential versus the ionically conductive medium without the at least one protic ionic liquid.

18. The method of claim 1, wherein the presence of the proton produces a shift of greater than or equal to about 1 Y in the half-wave potential for oxygen reduction versus the ionic liquid without the added an oxygen reduction enhancing compound.

* * * * *